United States Patent
Noh et al.

(10) Patent No.: US 9,235,098 B2
(45) Date of Patent: Jan. 12, 2016

(54) REFLECTIVE COLOR DISPLAY

(71) Applicant: Samsung Electronics Co., Ltd., Suwon-Si, Gyeonggi-Do (KR)

(72) Inventors: Chang-ho Noh, Suwon-si (KR); Rupasree Ragini Das, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/771,449

(22) Filed: Feb. 20, 2013

(65) Prior Publication Data

US 2013/0265628 A1 Oct. 10, 2013

(30) Foreign Application Priority Data

Apr. 6, 2012 (KR) .................. 10-2012-0036242

(51) Int. Cl.
*G02F 1/15* (2006.01)
*G02F 1/153* (2006.01)
*G02F 1/157* (2006.01)
*C09K 9/02* (2006.01)

(52) U.S. Cl.
CPC . *G02F 1/153* (2013.01); *C09K 9/02* (2013.01); *G02F 1/157* (2013.01); *G02F 1/1521* (2013.01); *C09K 2211/1029* (2013.01); *C09K 2211/1051* (2013.01); *G02F 2001/1512* (2013.01)

(58) Field of Classification Search
CPC ...................................................... G02F 1/155
USPC ........... 359/265–275; 345/105; 252/582, 583, 252/586
See application file for complete search history.

(56) References Cited

U.S. PATENT DOCUMENTS

| | | | |
|---|---|---|---|
| 3,807,832 A * | 4/1974 | Castellion | 359/267 |
| 5,875,012 A | 2/1999 | Crawford et al. | |
| 7,061,559 B2 | 6/2006 | Khan et al. | |
| 7,312,914 B2 * | 12/2007 | Shinozaki et al. | 359/270 |
| 7,362,490 B2 * | 4/2008 | Park | 359/265 |
| 7,532,383 B2 * | 5/2009 | Jang et al. | 359/266 |
| 2005/0200935 A1 | 9/2005 | Liu et al. | |
| 2008/0278792 A1 | 11/2008 | Jang et al. | |
| 2012/0013966 A1 | 1/2012 | Das et al. | |

FOREIGN PATENT DOCUMENTS

| | | |
|---|---|---|
| EP | 2555048 A1 | 2/2013 |
| KR | 19980009422 A | 4/1998 |
| KR | 20010001456 A | 1/2001 |

(Continued)

OTHER PUBLICATIONS

Extended European Search Report issued in Application No. 13162364.7 and dated Sep. 24, 2014.

*Primary Examiner* — Tuyen Tra
(74) *Attorney, Agent, or Firm* — Harness, Dickey & Pierce, P.L.C.

(57) ABSTRACT

A reflective color display may include a first electrode layer and a second electrode layer facing each other. An electrochromatic layer may be formed on the first electrode layer. The electrochromatic layer may include an electrochromatic material that is structured to display a color, to appear black, or to become transparent according to a voltage applied thereto. An electrolyte layer may contact the electrochromatic layer. The electrolyte layer may be located between the first electrode layer and the second electrode layer. A reflective layer may be disposed on the second electrode layer.

31 Claims, 16 Drawing Sheets

(56) References Cited

FOREIGN PATENT DOCUMENTS

| KR | 20070001653 A | 1/2007 |
| KR | 1020120007471 A | 1/2012 |
| WO | WO-9953373 A1 | 10/1999 |
| WO | WO-2006128820 A1 | 12/2006 |

* cited by examiner

FIG. 2

| | | | |
|---|---|---|---|
| +V | RED | GREEN | BLUE |
| 0 | TRANSPARENT | TRANSPARENT | TRANSPARENT |
| −V | BLACK | BLACK | BLACK |
| | \<R\> | \<G\> | \<B\> |

FIG. 3

| | | | |
|---|---|---|---|
| −V | RED | GREEN | BLUE |
| 0 | TRANSPARENT | TRANSPARENT | TRANSPARENT |
| +V | BLACK | BLACK | BLACK |
| | \<R\> | \<G\> | \<B\> |

REFLECTIVE COLOR DISPLAY

CROSS-REFERENCE TO RELATED APPLICATION

This application claims priority under 35 U.S.C. §119 to Korean Patent Application No. 10-2012-0036242, filed on Apr. 6, 2012, in the Korean Intellectual Property Office, the disclosure of which is incorporated herein in its entirety by reference.

BACKGROUND

1. Field

The present disclosure relates to reflective color displays, and more particularly, to electrochromic devices.

2. Description of the Related Art

Electrochromism refers to a reversible color change due to an electric field direction in response to the application of a voltage. An electrochromic material refers to a material with optical characteristics that vary according to an electrochemical redox reaction. An electrochromic material may not display color when an electric field is not applied and may display color when an electric field is applied. Alternatively, an electrochromic material may display color when an electric field is not applied and may not display color when an electric field is applied. Due to these characteristics, an electrochromic material is used in an electrochromic device.

Electrochromatic devices are used in devices using light-transmissive characteristics, such as smart windows, and are further used in e-paper due to their light-weight nature and portability.

Electrochromic devices, like typical display devices, produce color based on a unit pixel including a red display unit, a green display unit, and a blue display unit. To display red, a red display unit of an electrochromic device may allow only red light from among white light to pass therethrough and then the red light is reflected, and the other color units may allow the white light to pass therethrough and then the white light is reflected. This color display method may also be applied to green and blue display methods. To display white, an electrochromatic device may allow white light to pass through all the color display units and then may reflect the white light. Also, to display black, an electrochromatic device may allow all the color display units to display their corresponding color, or a material for displaying black may be separately used. However, these methods may result in poor black visibility and are relatively complicated.

SUMMARY

Various example embodiments herein relate to reflective color display devices with improved color and black visibility.

A reflective color display may include a first electrode layer and a second electrode layer facing each other; an electrochromatic layer that is formed on the first electrode layer and includes an electrochromatic material that is structured (e.g., chemically-structured) to display a color, to appear black, or to become transparent according to a voltage applied thereto; an electrolyte layer that contacts the electrochromatic layer and is located between the first electrode layer and the second electrode layer; and a reflective layer disposed on the second electrode layer.

The electrochromatic material may be a compound that includes a first moiety that displays a color when in an oxidation state and a second moiety that appears/displays black when in a reduction state, wherein the first and second moieties are covalently bonded. Alternatively, the electrochromatic material may be a compound that includes a first moiety that displays a color when in a reduction state and a second moiety that appears/displays black when in an oxidation state, wherein the first and second moieties are covalently bonded.

The electrochromatic material may be a mixture including a first electrochromatic compound that displays a color when in an oxidation state and becomes transparent when in a reduction state, and a second electrochromatic compound that appears/displays black when in a reduction state and becomes transparent when in an oxidation state. Alternatively, the electrochromatic material may be a mixture including a third electrochromatic compound that displays a color when in a reduction state and becomes transparent when in an oxidation state, and a fourth electrochromatic compound that appears/displays black when in an oxidation state and becomes transparent when in an reduction state.

A reflective color display may include a first substrate and a second substrate facing each other; a first electrode layer disposed on the first substrate; a second electrode layer disposed on the second substrate; an electrochromatic layer that includes an electrochromatic material that is structured (e.g., chemically-structured) to display a color in an oxidation state and to appear/display black in a reduction state and is disposed on the first electrode layer; a reflective layer disposed on the second electrode layer; and an electrolyte layer that is located between the first electrode layer and the second electrode layer, and contacts the electrochromatic layer and the reflective layer.

A reflective color display may include a first substrate and a second substrate facing each other; a first electrode layer disposed on the first substrate; a second electrode layer disposed on the second substrate; an electrochromatic layer that includes an electrochromatic material that is structured (e.g., chemically-structured) to display a color in a reduction state and to appear/display black in an oxidation state and is disposed on the first electrode layer; a reflective layer disposed on the second electrode layer; and an electrolyte layer that is located between the first electrode layer and the second electrode layer, and contacts the electrochromatic layer and the reflective layer.

BRIEF DESCRIPTION OF THE DRAWINGS

The above examples and/or other aspects will become more apparent and readily appreciated when the following description is taken in conjunction with the accompanying drawings of which:

FIG. 2 is a schematic diagram of a color formation method performed by using a reflective color display according to a non-limiting embodiment;

FIG. 3 is a schematic diagram of another color formation method performed by using a reflective color display according to a non-limiting embodiment;

DETAILED DESCRIPTION

Figure 1:
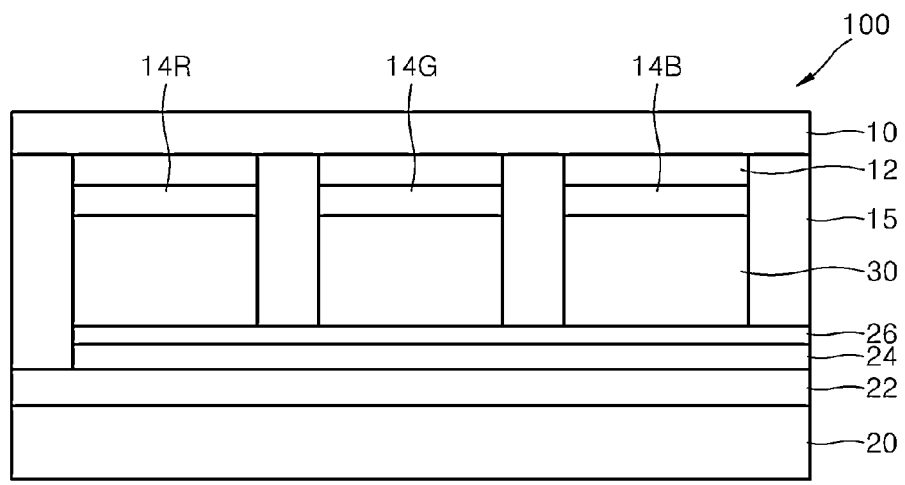
FIG. 1 is a schematic cross-sectional view of a reflective color display according to a non-limiting embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the language "at least one of" and "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a schematic cross-sectional view of a reflective color display device 100 according to a non-limiting embodiment. The reflective color display device 100 may include red (R), green (G), and blue (B) subpixels.

The reflective color display device 100 of FIG. 1 is described in more detail below. The reflective color display device 100 includes a first substrate 10 and a second substrate 20 which face each other and are transparent, and a first electrode layer 12 and a second electrode layer 22 which are respectively formed on the first substrate 10 and the second substrate 20. Electrochromatic layers 14R, 14G, and 14B are formed on the first electrode layer 12, and a counter redox layer 24 and a reflective layer 26 are sequentially formed on the second electrode layer 22. The first substrate 10 and the second substrate 20 are fixed by a spacing member 15, and an electrolyte 30 fills a space between the first substrate 10 and the second substrate 20.

The first and second substrate 10 and 20 are insulating substrates, and may be formed of transparent glass or plastic. Examples of plastic are polyacrylate (PA), polyethylene terephthalate (PET), polyethylene naphthalate (PEN), polycarbonate (PC), polyetherimide (PEI), polyethersulfone (PES), and polyimide (PI), although the disclosure is not limited thereto.

The first electrode layer 12 may be formed of a transparent conductive material. For example, the first electrode layer 12 may include an inorganic conductive material, such as an indium tin oxide (ITO) or a fluorine tin oxide (FTO), or an organic conductive material, such as polyacetylene or polythiophene. However, it should be understood that a material for forming the first electrode layer 12 is not limited to the above examples. The first electrode layer 12 may be a working electrode.

The second electrode layer 22 may be formed of a transparent material or a non-transparent conductive material. For example, the second electrode layer 22 may include a metal, such as Al, an indium tin oxide (ITO), a fluorine tin oxide (FTO), an antimony doped tin oxide (ATO), or a combination thereof, but it should be understood that a material for forming the second electrode layer 22 is not limited thereto. The second electrode layer 22 may be a counter electrode.

The electrochromatic layers 14R, 14G, and 14B may each include an electrochromic material that enables the display of multi-color and middle-range gray scale color according to a redox state.

An electrochromatic material used in the electrochromatic layer 14R may include an organic compound that displays red when in an oxidation state, and black when in a reduction state. In this regard, when an oxidizing voltage (positive (+) voltage) is applied to the first electrode layer 12, the electrochromatic material of the electrochromatic layer 14R donates electrons to the first electrode layer 12, thereby becoming oxidized, and thus, turning red. When a reducing voltage (negative (−) voltage) is applied to the first electrode layer 12, the electrochromatic material accepts electrons from the first electrode layer 12, thereby becoming reduced, and thus, turning black. When a voltage is not applied (0 V), the electrochromic material is transparent. Also, the electrochromatic material used in the electrochromatic layer 14R may display a red gray scale between 0 V and the oxidizing voltage, and a black gray scale between 0 V and the reducing voltage.

As the electrochromatic material used in the electrochromatic layer 14R, for example, a compound represented by Formula 1A below may be used:

The compound of Formula 1A has a moiety (a) that displays red when oxidized and a moiety (b) that displays black when reduced, wherein the moiety (a) and the moiety (b) are covalently bonded via an alkyl bridge. Accordingly, when a voltage is not applied, the compound of Formula 1A may be transparent; when an oxidizing voltage is applied and the moiety (a) is oxidized, the compound turns red; and when a reducing voltage is applied and the moiety (b) is reduced, the compound may turn black.

Also, the electrochromatic material used in the electrochromatic layer 14R may be a mixture including an electrochromatic material for displaying red and an electrochromatic material for displaying black. In this regard, when an oxidizing voltage (positive (+) voltage) is applied to the first electrode layer 12, the electrochromatic material for displaying red donates electrons to the first electrode layer 12, thereby becoming oxidized, and thus, turning red. When a reducing voltage (negative (−) voltage) is applied to the first electrode layer 12, the electrochromatic material for displaying black accepts electrons from the first electrode layer 12, thereby becoming reduced, and thus, turning black. When a voltage is not applied (0 V), the two materials turn transparent. Also, the electrochromatic material for displaying red may display a red gray scale between 0 V and the oxidizing voltage, and the electrochromatic material for displaying black may display a black gray scale between 0 V and the reducing voltage.

As the electrochromatic material used in the electrochromatic layer 14R, for example, a mixture including at least one of the compounds represented by Formula 2A1 or Formula 2A2, which display red when oxidized, and at least one of the

[Formula 1A]

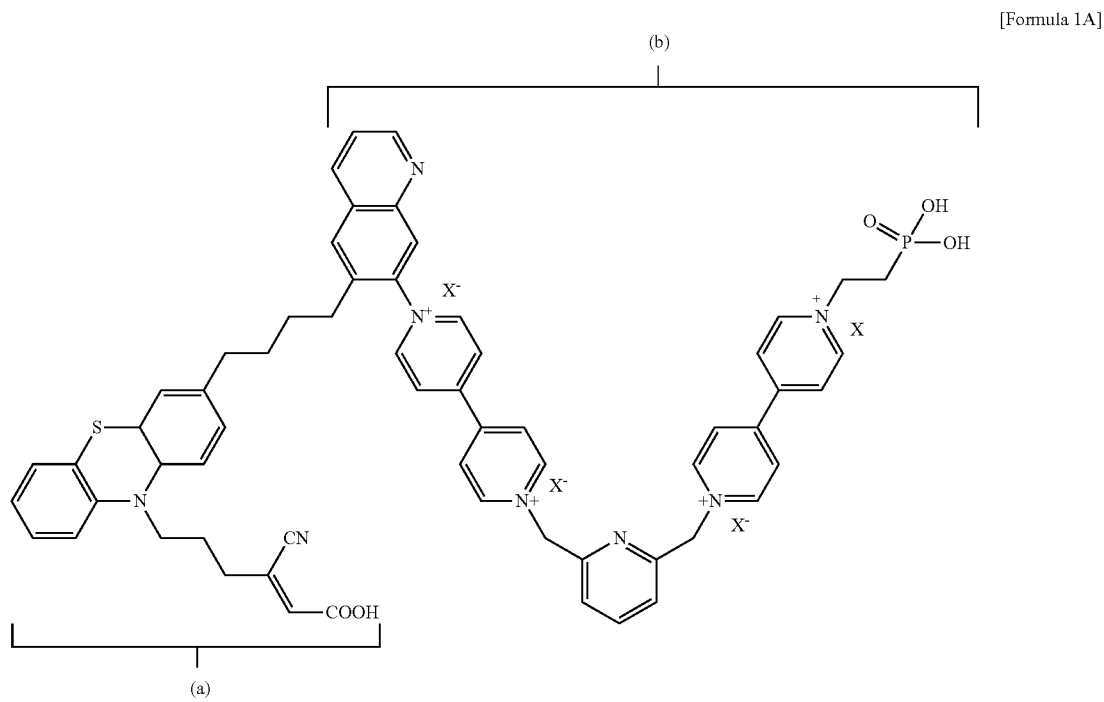

wherein X⁻ is a halogen anion, such as F⁻, Cl⁻, Br⁻, or the like.

compounds represented by Formula 2B1 or Formula 2B2, which display black when reduced, may be used:

[Formula 2A1]

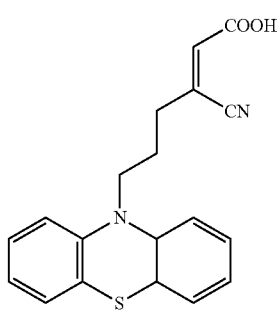

[Formula 2A2]

[Formula 2B1]

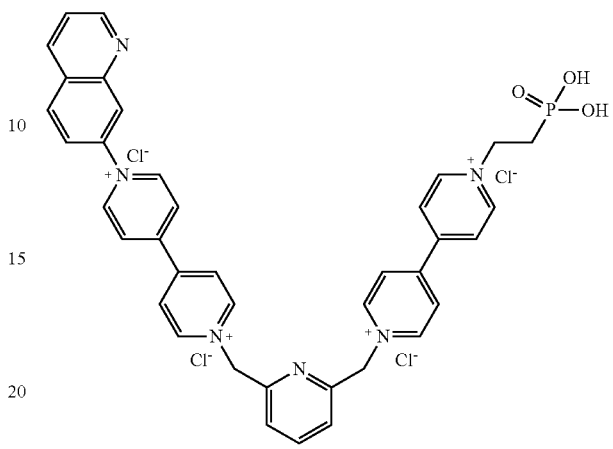

[Formula 2B2]

wherein $X^-$ is a halogen anion, such as $F^-$, $Cl^-$, $Br^-$, or the like.

When a voltage is not applied, the mixture is transparent. When an oxidizing voltage is applied, the compound of Formula 2A1 or Formula 2A2 is oxidized, and thus, turns red. When a reducing voltage is applied, the compound of Formula 2B1 or Formula 2B2 is reduced, and thus, turns black.

An electrochromatic material used in the electrochromatic layer 14G may include an organic compound that displays green in an oxidation state, and black in a reduction state. In this regard, the electrochromatic material of the electrochromatic layer 14G, when an oxidizing voltage (positive (+) voltage) is applied to the first electrode layer 12, donates electrons to the first electrode layer 12, thereby becoming oxidized, and thus, turning green. When a reducing voltage (negative (−) voltage) is applied to the first electrode layer 12, the electrochromatic material accepts electrons from the first electrode layer 12, thereby becoming reduced, and thus, turning black. When a voltage is not applied (0 V), the electrochromic material is transparent. Also, the electrochromatic material used in the electrochromatic layer 14G may display a green gray scale between 0 V and the oxidizing voltage, and a black gray scale between 0 V and the reducing voltage.

As the electrochromatic material used in the electrochromatic layer 14G, for example, a compound represented by Formula 3A or 3B below may be used:

[Formula 3A]

[Formula 3B]

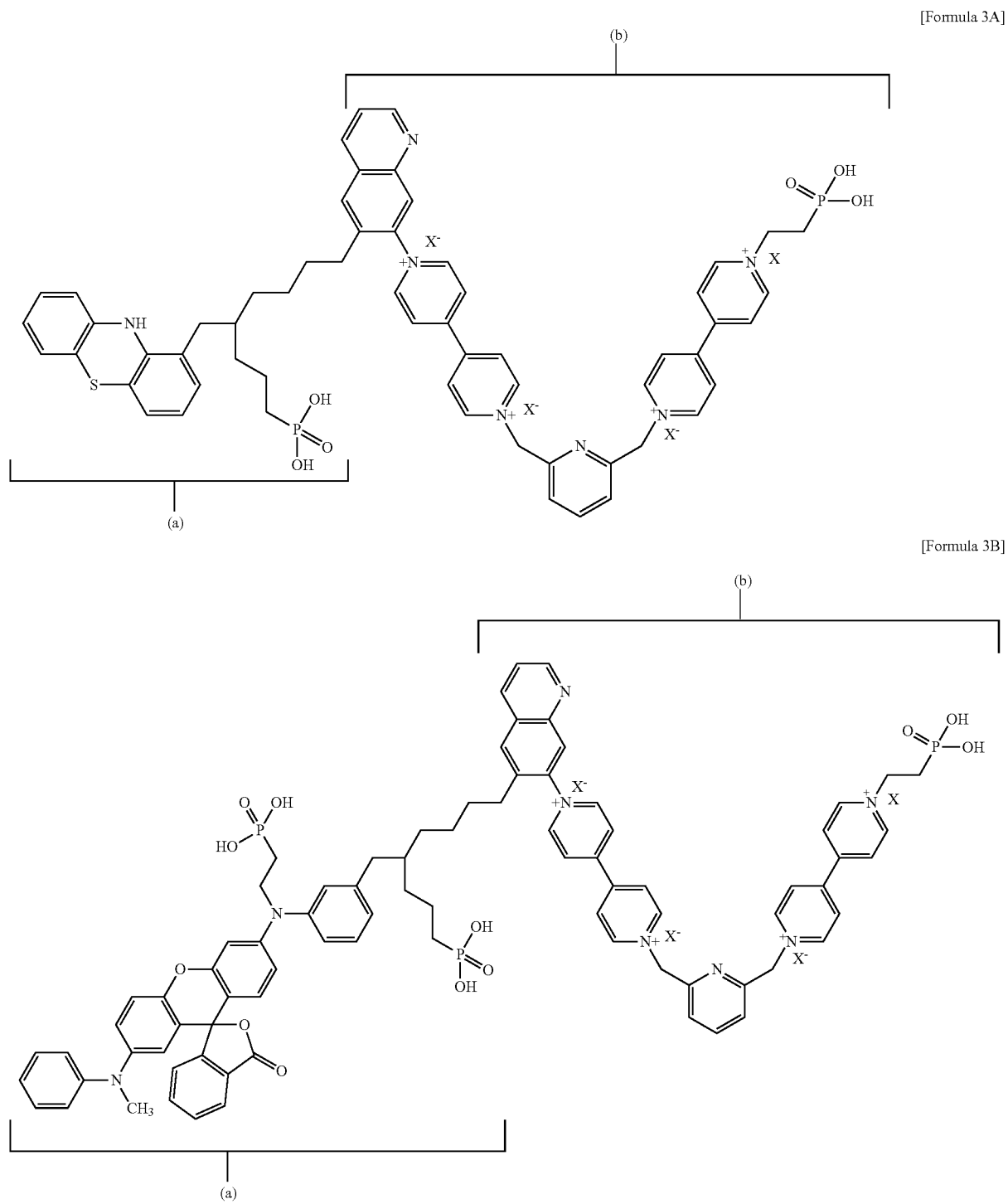

wherein X⁻ is a halogen anion, such as F⁻, Cl⁻, Br⁻, or the like.

The compound of Formula 3A or 3B has a moiety (a) that displays green when oxidized and a moiety (b) that displays black when reduced, wherein the moiety (a) and the moiety (b) are covalently bonded via an alkyl bridge. Accordingly, when a voltage is not applied, the compound of Formula 3A and 3B may be transparent; when an oxidizing voltage is applied and the moiety (a) is oxidized, the compound turns green; and when a reducing voltage is applied and the moiety (b) is reduced, the compound may turn black.

Also, the electrochromatic material used in the electrochromatic layer 14G may be a mixture including an electrochromatic material for displaying green and an electrochromatic material for displaying black. In this regard, when an oxidizing voltage (positive (+) voltage) is applied to the first electrode layer 12, the electrochromatic material for displaying green donates electrons to the first electrode layer 12, thereby becoming oxidized, and thus, turning green. When a reducing voltage (negative (−) voltage) is applied to the first electrode layer 12, the electrochromatic material for displaying black accepts electrons from the first electrode layer 12, thereby becoming reduced, and thus, turning black. When a voltage is not applied (0 V), the two materials turn transparent. Also, the electrochromatic material for displaying green may display a green gray scale between 0 V and the oxidizing voltage, and the electrochromatic material for displaying black may display a black gray scale between 0 V and the reducing voltage.

As the electrochromatic material used in the electrochromatic layer 14G, for example, a mixture including at least one of the compounds represented by Formula 4A1 or Formula 4A2, which display green when oxidized, and at least one of the compounds represented by Formula 2B1 or Formula 2B2, which display black when reduced, may be used:

[Formula 4A1]

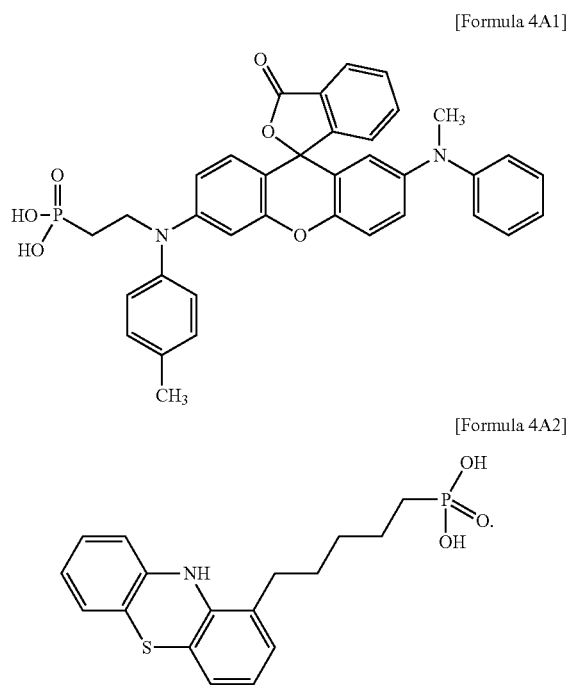

[Formula 4A2]

When a voltage is not applied, the mixture is transparent. When an oxidizing voltage is applied, the compound of Formula 4A1 or Formula 4A2 is oxidized, and thus, turns green. When a reducing voltage is applied, the compound of Formula 2B1 or Formula 2B2 is reduced, and thus, turns black.

An electrochromatic material used in the electrochromatic layer 14B may include an organic compound that displays blue when in an oxidation state, and black when in a reduction state. In this regard, the electrochromatic material of the electrochromatic layer 14B, when an oxidizing voltage (positive (+) voltage) is applied to the first electrode layer 12, donates electrons to the first electrode layer 12, thereby becoming oxidized, and thus, turning blue. When a reducing voltage (negative (−) voltage) is applied to the first electrode layer 12, the electrochromatic material accepts electrons from the first electrode layer 12, thereby becoming reduced, and thus, turning black. When a voltage is not applied (0 V), the electrochromic material is transparent. Also, the electrochromatic material used in the electrochromatic layer 14B may display a blue gray scale between 0 V and the oxidizing voltage, and a black gray scale between 0 V and the reducing voltage.

As the electrochromatic material used in the electrochromatic layer 14B, for example, a compound represented by Formula 5A below may be used:

[Formula 5A]

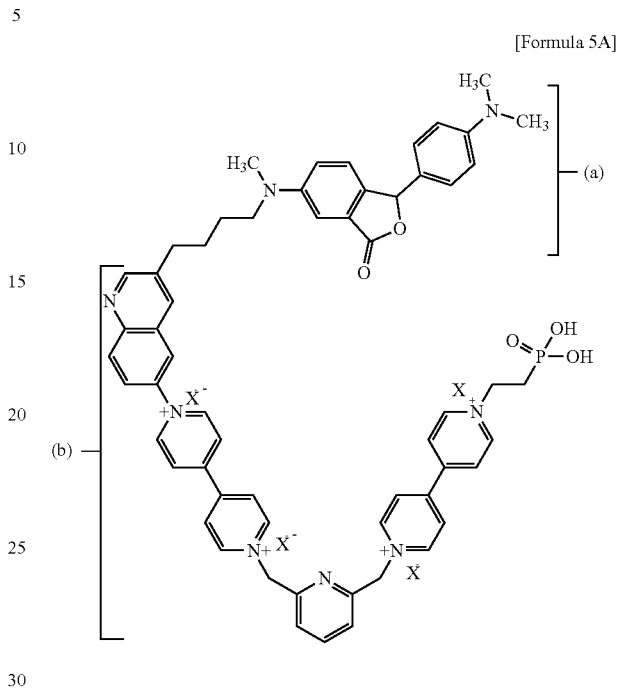

wherein $X^-$ is a halogen anion, such as $F^-$, $Cl^-$, $Br^-$, or the like.

The compound of Formula 5A has a moiety (a) that displays blue when oxidized and a moiety (b) that displays black when reduced, wherein the moiety (a) and the moiety (b) are covalently bonded via an alkyl bridge. Accordingly, when a voltage is not applied, the compound of Formula 5A may be transparent; when an oxidizing voltage is applied and the moiety (a) is oxidized, the compound turns blue; and when a reducing voltage is applied and the moiety (b) is reduced, the compound may turn black.

Also, the electrochromatic material used in the electrochromatic layer 14B may be a mixture including an electrochromatic material for displaying blue and an electrochromatic material for displaying black. In this regard, when an oxidizing voltage (positive (+) voltage) is applied to the first electrode layer 12, the electrochromatic material for displaying blue donates electrons to the first electrode layer 12, thereby becoming oxidized, and thus, turning blue. When a reducing voltage (negative (−) voltage) is applied to the first electrode layer 12, the electrochromatic material for displaying black accepts electrons from the first electrode layer 12, thereby becoming reduced, and thus, turning black. When a voltage is not applied (0 V), the two materials turn transparent. Also, the electrochromatic material for displaying blue may display a blue gray scale between 0 V and the oxidizing voltage, and the electrochromatic material for displaying black may display a black gray scale between 0 V and the reducing voltage.

As the electrochromatic material used in the electrochromatic layer 14B, for example, a mixture including the compound represented by Formula 6A1 that displays blue when oxidized, and at least one of compounds represented by Formula 2B1 or Formula 2B2, which display black when reduced, may be used:

[Formula 6A1]

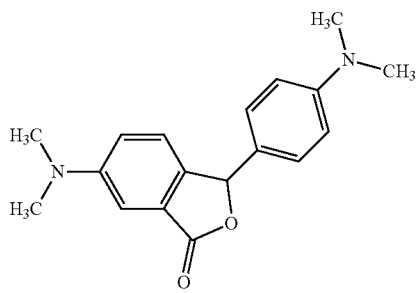

When a voltage is not applied, the mixture is transparent. When an oxidizing voltage is applied, the compound of Formula 6A1 is oxidized, and thus, turns blue. When a reducing voltage is applied, the compound of Formula 2B1 or Formula 2B2 is reduced, and thus, turns black.

The electrochromatic materials described above may be supported by nano-size inorganic materials, such as titanium oxide ($TiO_2$). By doing so, more electrochromic materials may be adsorbed, thereby embodying a more distinctive color change.

The counter redox layer 24 may include a counter redox material. The counter redox material of the counter redox layer 24 is oxidized or reduced in an opposite direction to that of the electrochromatic material of the electrochromatic layer 14 to appropriately control a charge amount change, thereby allowing the electrochromatic material to be smoothly oxidized or reduced. That is, when the electrochromatic material of the electrochromatic layer 14 donates electrons to the first electrode layer 12 and thus, is oxidized, the counter redox material of the counter redox layer 24 accepts electrons from the second electrode layer 22 and thus, is reduced. When the electrochromatic material of the electrochromatic layer 14 accepts electrons from the first electrode layer 12 and thus, is reduced, the counter redox material of the counter redox layer 24 donates electrons to the second electrode layer 22 and thus, is oxidized. In this regard, an anion or cation included in an electrolyte moves to the electrochromatic material or the counter redox material, and thus, may function as a counter charge thereof. As the counter redox material, a material that is transparent and is not discolored according to redox may be used.

As the counter redox material, a reduction-type material that is reduced when the electrochromic material is oxidized and an oxidization-type material that is oxidized when the electrochromatic material is reduced may be used.

Examples of a reduction-type counter redox material are 1,2-diphenylethane, triphenylstibine, and a benzoquinone-based compound, such as benzoquinone, although the disclosure is not limited thereto.

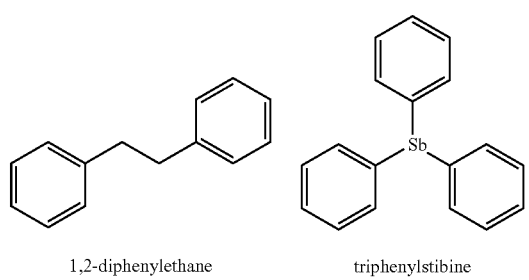

1,2-diphenylethane    triphenylstibine

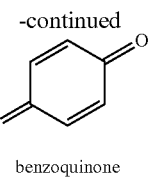

benzoquinone

Examples of an oxidization-type counter redox material are hydroquinone, antimony doped tin oxide (ATO), and a ferrocene-based compound, such as ferrocene, although the disclosure is not limited thereto.

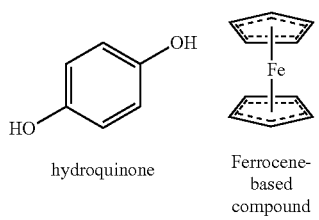

hydroquinone    Ferrocene-based compound

Selectively, the counter redox material may be used in a form that is capable of being dissolved in a solution of the electrolyte 30. For example, the counter redox material may be included in at least one of the counter redox layer 24 and the solution of the electrolyte 30.

The reflective layer 26 may reflect light that has passed through the electrochromatic layers 14R, 14G, and 14B toward the eyes of a viewer. The reflective layer 26 may be a titanium oxide ($TiO_2$) layer having an average diameter of, for example, about 300 nm, but is not limited thereto.

The electrolyte 30 may include an ionic electrolytic material that promotes a redox electrochromatic reaction of the electrochromatic layers 14R, 14G, and 14B, and may selectively include a counter redox material. The electrolyte 30 may be a liquid electrolyte or a solid polymer electrolyte. An example of a liquid electrolyte may be a solution in which a lithium salt, such as LiOH or $LiClO_4$, a potassium salt, such as KOH, a sodium salt, such as NaOH, or the like is dissolved in a solvent, but is not limited thereto. An example of a solid electrolyte may be poly(2-acrylamino-2-methylpropane sulfonic acid or poly(ethylene oxide), but is not limited thereto. The electrolyte 30 may selectively further include a reflective material. The reflective material used in the electrolyte 30 may be also used as a material for forming the reflective layer 26, and like in the reflective layer 26, the reflective material of the electrolyte 30 may increase a reflectance, thereby contributing to formation of clear color.

The spacing member 15 may maintain an interval between the first and second substrates 10 and 20, and a material for forming the spacing member 15 may be any one of various known and suitable materials.

FIG. 2 is a schematic diagram for explaining a color formation method performed by the reflective color display device 100. The reflective color display device 100 displays color when the electrochromatic material is in an oxidization state, and displays black when the electrochromatic material is in a reduction state.

Referring to FIG. 2, to display red, an oxidizing voltage (+V) is applied to a red subpixel (R), and a voltage is not applied to a green subpixel (G) or a blue subpixel (B). When an oxidizing voltage (+V) is applied to a red subpixel (R), the electrochromatic layer 14R of the red subpixel (R) may allow red light to pass therethrough, and the red light that passed through the electrochromatic layer 14R is reflected by the reflective layer 26. In this regard, the electrochromatic layers 14G and 14B of the green subpixel (G) and the blue subpixel (B) to which a voltage is not applied maintain their transparency, so that in the green subpixel (G) and the blue subpixel (B), white light is reflected by the reflective layer 26. Accordingly, a pixel may display red.

Likewise, to display green, an oxidizing voltage (+V) is applied to the green subpixel (G), and a voltage is not applied to the red subpixel (R) or the blue subpixel (B). To display blue, an oxidizing voltage (+V) is applied to the blue subpixel (B), and a voltage is not applied to the red subpixel (R) or the green subpixel (G).

To display white light, a voltage is not applied to the red subpixel (R), the green subpixel (G), or the blue subpixel (B). In this regard, the electrochromatic layers 14R, 14G, and 14B of the respective subpixels maintain their transparency, so that white light is reflected by the reflective layer 26, thereby allowing a pixel to display white light.

To display black, a reducing voltage (−V) is applied to the red subpixel (R), the green subpixel (G), and the blue subpixel (B). In this regard, the electrochromatic layers 14R, 14G, and 14B of the respective subpixels are all reduced, thereby displaying black, so that light is not reflected by the reflective In an alternative embodiment, the reflective color display device 100 may be configured such that the electrochromatic materials of the electrochromatic layers 14R, 14G, and 14B display red, green, or blue in a reduction state, and display black in an oxidation state.

The electrochromatic material used in the electrochromatic layer 14R may include an organic compound that displays red in a reduction state, and black in an oxidation state. In this regard, when a reducing voltage (negative (−) voltage) is applied to the first electrode layer 12, the electrochromatic material of the electrochromatic layer 14R accepts electrons from the first electrode layer 12, thereby becoming reduced and thus turning red. When an oxidizing voltage (positive (+) voltage) is applied to the first electrode layer 12, the electrochromatic material donates electrons to the first electrode layer 12, thereby becoming oxidized, and thus, turning black. When a voltage is not applied (0 V), the electrochromatic material is transparent. Also, the electrochromatic material used in the electrochromatic layer 14R may display a red gray scale between 0 V and the reducing voltage, and a black gray scale between 0 V and the oxidizing voltage.

As the electrochromatic material used in the electrochromatic layer 14R, for example, a compound represented by Formula 7A below may be used:

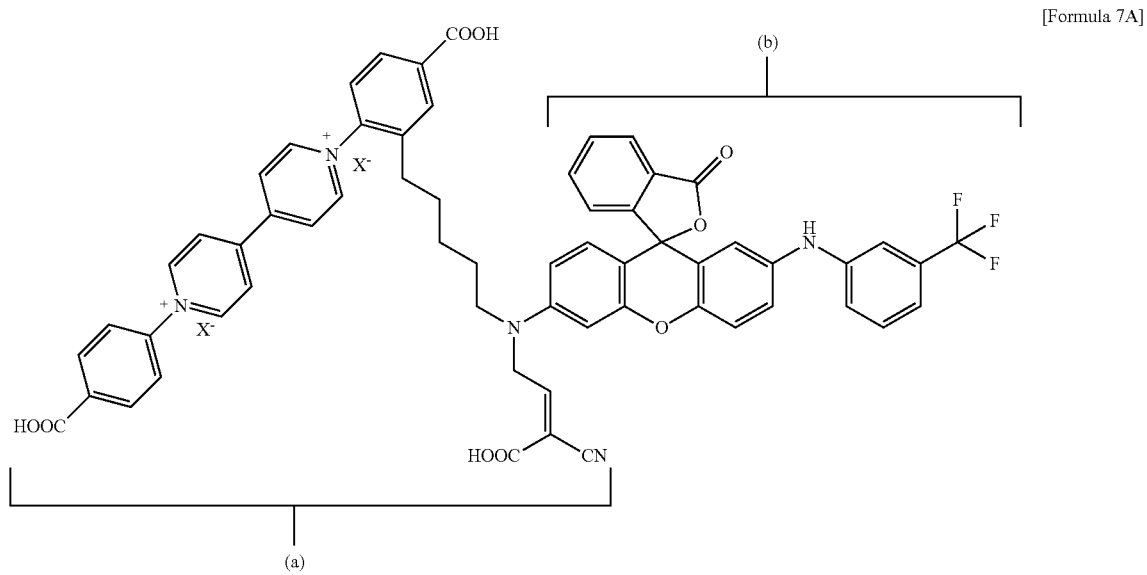

[Formula 7A]

layer 26 or black-like color is reflected by the reflective layer 26, thereby allowing a pixel to display black.

A reflective color display device according to another non-limiting embodiment is described below with reference to FIG. 1.

As discussed above, the reflective color display device 100 includes the first substrate 10 and the second substrate 20 which face each other and are transparent, and the first electrode layer 12 and the second electrode layer 22 which are respectively formed on the first substrate 10 and the second substrate 20. The electrochromatic layers 14R, 14G, and 14B are formed on the first electrode layer 12, and the counter redox layer 24 and the reflective layer 26 are sequentially formed on the second electrode layer 22. The first substrate 10 and the second substrate 20 are fixed by the spacing member 15, and the electrolyte 30 fills a space between the first substrate 10 and the second substrate 20.

wherein $X^-$ is a halogen anion, such as $F^-$, $Cl^-$, $Br^-$, or the like.

The compound of Formula 7A has a moiety (a) that displays red when reduced and a moiety (b) that displays black when oxidized, wherein the moiety (a) and the moiety (b) are covalently bonded via an alkyl bridge. Accordingly, when a voltage is not applied, the compound of Formula 7A may be transparent; when a reducing voltage is applied and the moiety (a) is reduced, the compound turns red; and when an oxidizing voltage is applied and the moiety (b) is oxidized, the compound may turn black.

Also, the electrochromatic material used in the electrochromatic layer 14R may be a mixture including an electrochromatic material for displaying red and an electrochromatic material for displaying black. In this regard, when a reducing voltage (negative (−) voltage) is applied to the first electrode layer 12, the electrochromatic material for displaying red accepts electrons from the first electrode layer 12, thereby becoming reduced and thus turning red. When an oxidizing voltage (positive (+) voltage) is applied to the first electrode layer 12, the electrochromatic material for displaying black donates electrons to the first electrode layer 12, thereby becoming oxidized, and thus, turning black. When a voltage is not applied (0 V), the two materials turn transparent. Also, the electrochromatic material for displaying red may display a red gray scale between 0 V and the reducing voltage, and the electrochromatic material for displaying black may display a black gray scale between 0 V and the oxidizing voltage.

As the electrochromatic material used in the electrochromatic layer 14R, for example, a mixture including a compound represented by Formula 8A1 that displays red when reduced, and at least one of the compounds represented by Formula 8B1 or Formula 8B2, which display black when oxidized, may be used:

[Formula 8A1]

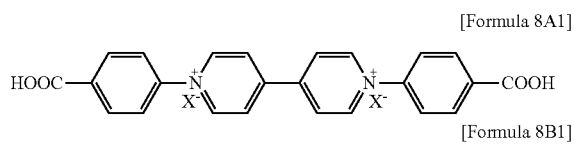

[Formula 8B1]

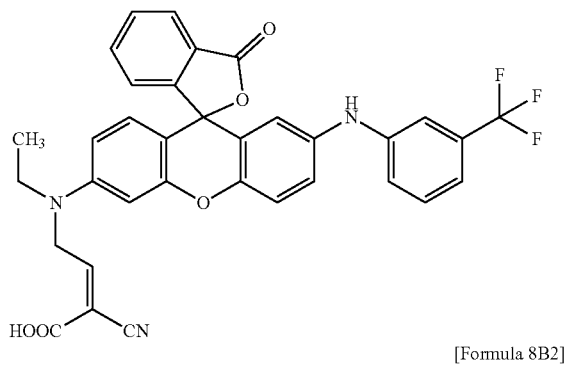

[Formula 8B2]

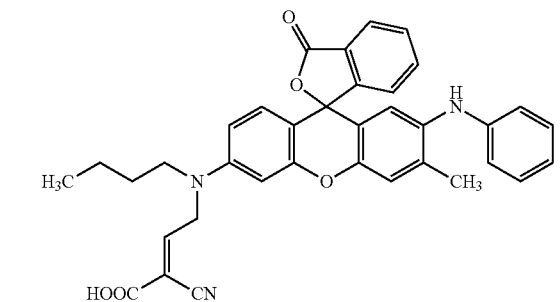

wherein in Formula 8A1, $X^-$ is a halogen anion, such as $F^-$, $Cl^-$, $Br^-$, or the like.

When a voltage is not applied, the mixture is transparent. When a reducing voltage is applied, the compound of Formula 8A1 is reduced, and thus, turns red. When an oxidizing voltage is applied, the compound of Formula 8B1 or Formula 8B2 is oxidized, and thus, turns black.

The electrochromatic material used in the electrochromatic layer 14G may include an organic compound that displays green in a reduction state, and black in an oxidation state. In this regard, when a reducing voltage (negative (−) voltage) is applied to the first electrode layer 12, the electrochromatic material of the electrochromatic layer 14G accepts electrons from the first electrode layer 12, thereby becoming reduced and thus turning green. When an oxidizing voltage (positive (+) voltage) is applied to the first electrode layer 12, the electrochromatic material donates electrons to the first electrode layer 12, thereby becoming oxidized, and thus, turning black. When a voltage is not applied (0 V), the electrochromatic material is transparent. Also, the electrochromatic material used in the electrochromatic layer 14G may display a green gray scale between 0 V and the reducing voltage, and a black gray scale between 0 V and the oxidizing voltage.

As the electrochromatic material used in the electrochromatic layer 14G, for example, a compound represented by Formula 9A below may be used:

[Formula 9A]

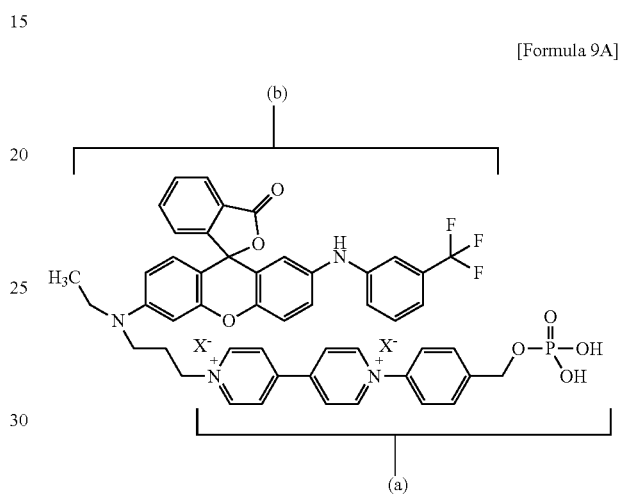

wherein $X^-$ is a halogen anion, such as $F^-$, $Cl^-$, $Br^-$, or the like.

The compound of Formula 9A has a moiety (a) that displays green when reduced and a moiety (b) that displays black when oxidized, wherein the moiety (a) and the moiety (b) are covalently bonded via an alkyl bridge. Accordingly, when a voltage is not applied, the compound of Formula 9A may be transparent; when a reducing voltage is applied and the moiety (a) is reduced, the compound turns green; and when an oxidizing voltage is applied and the moiety (b) is oxidized, the compound may turn black.

Also, the electrochromatic material used in the electrochromatic layer 14G may be a mixture including an electrochromatic material for displaying green and an electrochromatic material for displaying black. In this regard, when a reducing voltage (negative (−) voltage) is applied to the first electrode layer 12, the electrochromatic material for displaying green accepts electrons from the first electrode layer 12, thereby becoming reduced and thus turning green. When an oxidizing voltage (positive (+) voltage) is applied to the first electrode layer 12, the electrochromatic material for displaying black donates electrons to the first electrode layer 12, thereby becoming oxidized, and thus, turning black. When a voltage is not applied (0 V), the two materials turn transparent. Also, the electrochromatic material for displaying green may display a green gray scale between 0 V and the reducing voltage, and the electrochromatic material for displaying black may display a black gray scale between 0 V and the oxidizing voltage.

As the electrochromatic material used in the electrochromatic layer 14G, for example, a mixture including at least one of the compounds represented by Formula 10A1 or Formula 10A2 that display green when reduced, and at least one of the compounds represented by Formula 8B1 or Formula 8B2, which display black when oxidized, may be used:

[Formula 10A1]

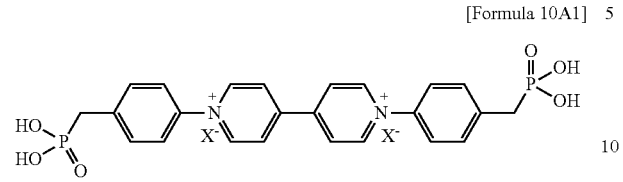

[Formula 10A2]

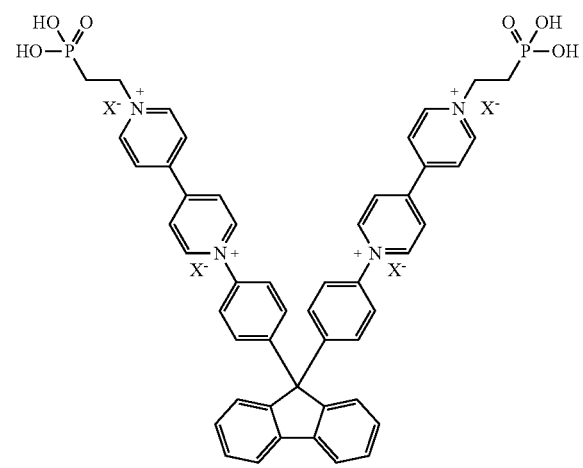

wherein X⁻ is a halogen anion, such as F⁻, Cl⁻, Br⁻, or the like.

When a voltage is not applied, the mixture is transparent. When a reducing voltage is applied, the compound of Formula 10A1 or 10A2 is reduced, and thus, turns green. When an oxidizing voltage is applied, the compound of Formula 8B1 or Formula 8B2 is oxidized, and thus, turns black.

The electrochromatic material used in the electrochromatic layer 14B may include an organic compound that displays blue in a reduction state, and black in an oxidation state. In this regard, when a reducing voltage (negative (−) voltage) is applied to the first electrode layer 12, the electrochromatic material of the electrochromatic layer 14B accepts electrons from the first electrode layer 12, thereby becoming reduced and thus turning blue. When an oxidizing voltage (positive (+) voltage) is applied to the first electrode layer 12, the electrochromatic material donates electrons to the first electrode layer 12, thereby becoming oxidized, and thus, turning black. When a voltage is not applied (0 V), the electrochromatic material is transparent. Also, the electrochromatic material used in the electrochromatic layer 14B may display a blue gray scale between 0 V and the reducing voltage, and a black gray scale between 0 V and the oxidizing voltage.

As the electrochromatic material used in the electrochromatic layer 14B, for example, a compound represented by Formula 11A below may be used:

[Formula 11A]

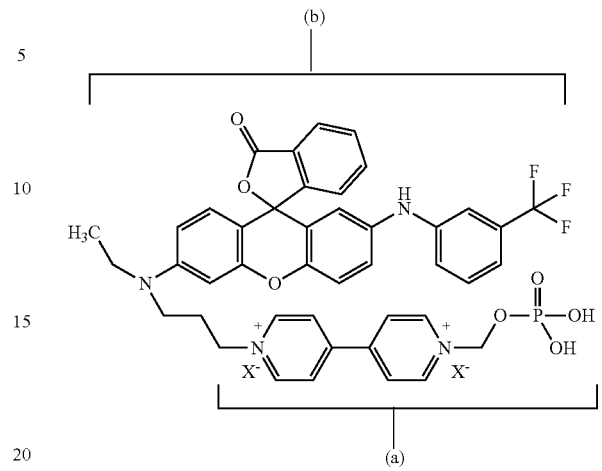

wherein X⁻ is a halogen anion, such as F⁻, Cl⁻, Br⁻, or the like.

The compound of Formula 11A has a moiety (a) that displays blue when reduced and a moiety (b) that displays black when oxidized, wherein the moiety (a) and the moiety (b) are covalently bonded via an alkyl bridge. Accordingly, when a voltage is not applied, the compound of Formula 11A may be transparent; when a reducing voltage is applied and the moiety (a) is reduced, the compound turns blue; and when an oxidizing voltage is applied and the moiety (b) is oxidized, the compound may turn black.

Also, the electrochromatic material used in the electrochromatic layer 14B may be a mixture including an electrochromatic material that displays blue when reduced, and an electrochromatic material that displays black when oxidized. In this regard, when a reducing voltage (negative (−) voltage) is applied to the first electrode layer 12, the electrochromatic material for displaying blue accepts electrons from the first electrode layer 12, thereby becoming reduced and thus turning blue. When an oxidizing voltage (positive (+) voltage) is applied to the first electrode layer 12, the electrochromatic material for displaying black donates electrons to the first electrode layer 12, thereby becoming oxidized, and thus, turning black. When a voltage is not applied (0 V), the two materials turn transparent. Also, the electrochromatic material for displaying blue may display a blue gray scale between 0 V and the reducing voltage, and the electrochromatic material for displaying black may display a black gray scale between 0 V and the oxidizing voltage.

As the electrochromatic material used in the electrochromatic layer 14B, for example, a mixture including a compound represented by Formula 12A1 that displays blue when reduced, and at least one of the compounds represented by Formula 8B1 or Formula 8B2 which display black when oxidized, may be used:

[Formula 12A1]

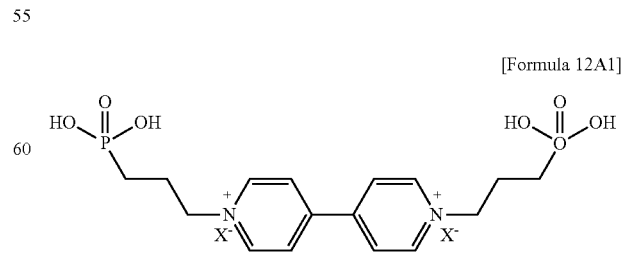

wherein X⁻ is a halogen anion, such as F⁻, Cl⁻, Br⁻, or the like.

When a voltage is not applied, the mixture is transparent. When a reducing voltage is applied, the compound of Formula 12A1 is reduced, and thus, turns blue. When an oxidizing voltage is applied, the compound of Formula 8B1 or Formula 8B2 is oxidized, and thus, turns black.

FIG. 3 is a schematic diagram of the above color formation method that may be performed by the reflective color display 100, according to a non-limiting embodiment. The reflective color display 100 displays a color when the electrochromatic material is in a reduction state, and displays black when the electrochromatic material is in an oxidation state.

Referring to FIG. 3, to display red, a reducing voltage (−V) is applied to the red subpixel (R), and a voltage is not applied to the green subpixel (G) or the blue subpixel (B). When a reducing voltage (−V) is applied to the red subpixel (R), the electrochromatic layer 14R of the red subpixel (R) may allow red light to pass therethrough, and the red light that passes through the electrochromatic layer 14R is reflected by the reflective layer 26. In this regard, the electrochromatic layers 14G and 14B of the green subpixel (G) and the blue subpixel (B) to which a voltage is not applied maintain their transparency, so that in the green subpixel (G) and the blue subpixel (B), white light is reflected by the reflective layer 26. Accordingly, a pixel may display red.

Likewise, to display green, a reducing voltage (−V) is applied to the green subpixel (G), and a voltage is not applied to the red subpixel (R) or the blue subpixel (B). To display blue, a reducing voltage (−V) is applied to the blue subpixel (B), and a voltage is not applied to the red subpixel (R) and the green subpixel (G).

To display white light, a voltage is not applied to the red subpixel (R), the green subpixel (G), and the blue subpixel (B). In this regard, the electrochromatic layers 14R, 14G, and 14B of the respective subpixels maintain their transparency, so that white light is reflected by the reflective layer 26, thereby allowing a pixel to display white light.

To display black, an oxidizing voltage (+V) is applied to the red subpixel (R), the green subpixel (G), and the blue subpixel (B). In this regard, the electrochromatic layers 14R, 14G, and 14B of the respective subpixels are all oxidized, thereby displaying black, so that light is not reflected by the reflective layer 26 or black-like color is reflected by the reflective layer 26, thereby allowing a pixel to display black.

EXAMPLE 1

400 mg of the compound of Formula 2A1 and 900 mg of the compound of Formula 2B1 were dissolved in 50 ml of 2,2,3,3-tetrafluoropropanol to prepare a solution for forming an electrochromatic layer. The compound of Formula 2A1 is an electrochromatic material that turns red when oxidized, and the compound of Formula 2B1 is an electrochromatic material that turns black when reduced:

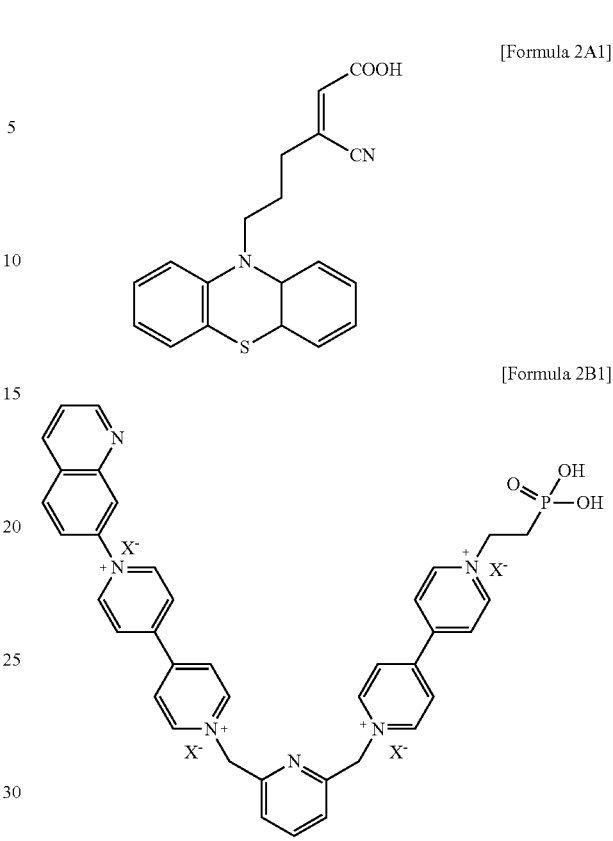

wherein $X^-$ is a halogen anion, such as $F^-$, $Cl^-$, $Br^-$, or the like.

Subsequently, a test cell was manufactured as follows. Titanium dioxide ($TiO_2$) nanoparticles having an average particle size of 25 nm were coated on an ITO glass substrate to form a first electrode layer having a thickness of 5 um. Separately, an ATO layer having a thickness of 0.1 um was formed as a second electrode layer on an ITO glass substrate, and a $TiO_2$ reflective layer having a thickness of 5 um was formed thereon, wherein an average particle size of $TiO_2$ was 300 nm. The first electrode layer including $TiO_2$ nanoparticles was immersed in the solution for forming the electrochromatic layer, thereby forming an electrochromatic layer on the first electrode layer.

0.1 mol $LiClO_4$ and 0.05 mol benzoquinone as a redox counter material were dissolved in 10 ml of γ-butyrolactone to prepare an electrolyte solution. An interval between the two separate glass substrate structures was adjusted by using a spacing member having a thickness of about 20 um, followed by injection with an electrolyte solution. Then, the resultant structure was sealed with a sealant, thereby completing the manufacture of an electrochromatic device.

EXAMPLE 2

An electrochromatic device was manufactured in the same manner as in Example 1, except that as the electrochromic material, the compound of Formula 4A1 that displays green when oxidized was used instead of the compound of Formula 2A1.

[Formula 4A1]

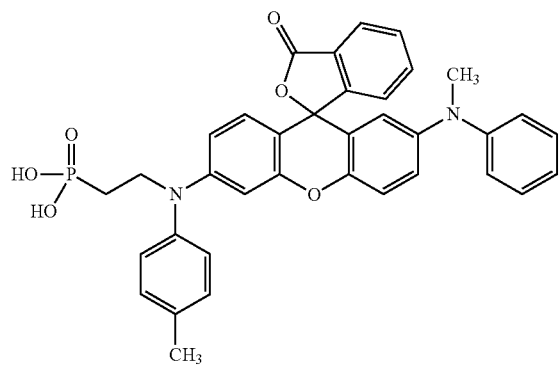

EXAMPLE 3

An electrochromatic device was manufactured in the same manner as in Example 1, except that as the electrochromic material, the compound of Formula 6A1 that displays blue when oxidized was used instead of the compound of Formula 2A1, and the compound of Formula 2B2 was used instead of the compound of Formula 2B1.

[Formula 2B2]

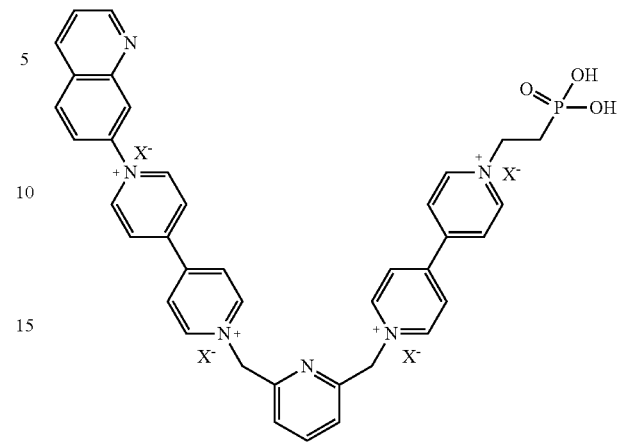

EXAMPLE 4

An electrochromatic device was manufactured in the same manner as in Example 1, except that as the electrochromic material, the compound of Formula 1A was used instead of the compound of Formula 2A1 and the compound of Formula 2B1. Electrochromatic characteristics measurement results were similar to those obtained in Example 1.

[Formula 1A]

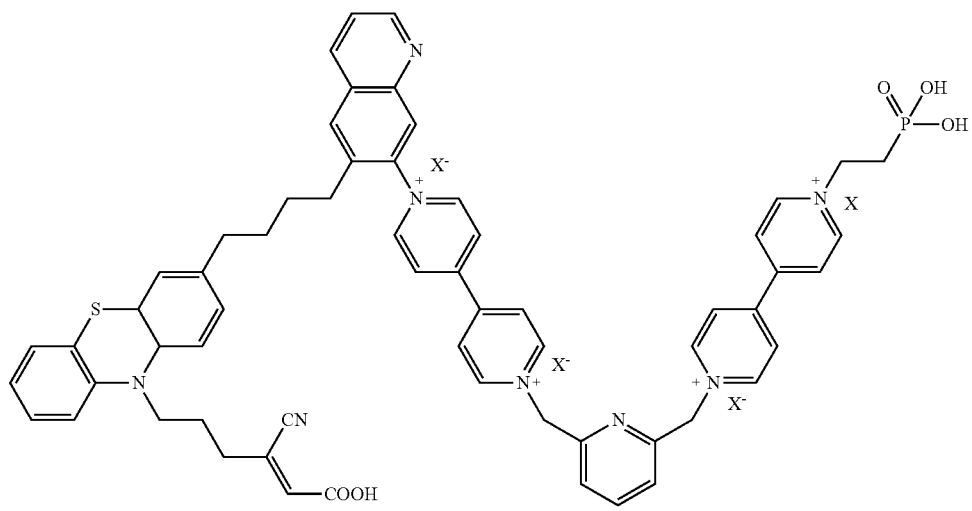

[Formula 6A1]

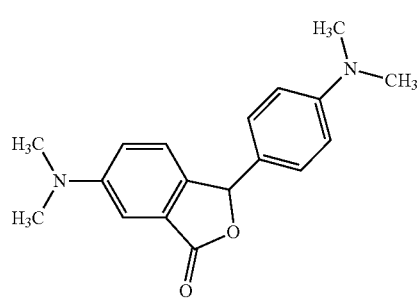

Electrochromatic Characteristics Evaluation

A reflectance with respect to wavelength when a reducing voltage is applied to the electrochromatic device manufactured according to Example 1 was measured. The reducing voltage was applied in a range of 0 V to −2.1 V at intervals of 0.3 V, and the lower applied voltage, that is, the greater the absolute value of the applied voltage is, the reflectance was reduced correspondingly.

Figure 4A:
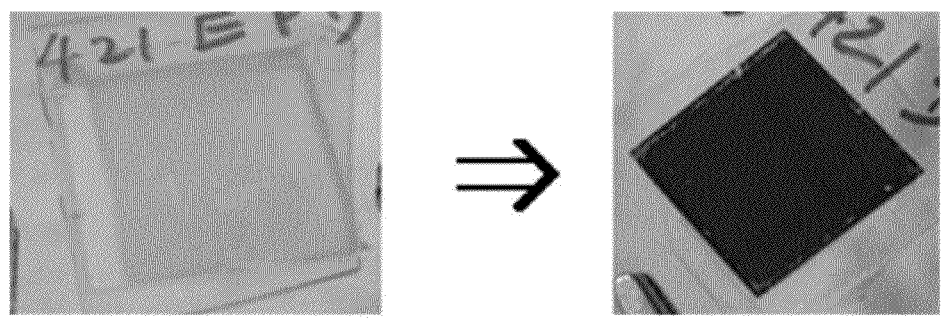
FIG. 4A is an image showing a color change of an electrochromatic device when a reducing voltage was applied to the electrochromatic device of Example 1.
Figure 4B:
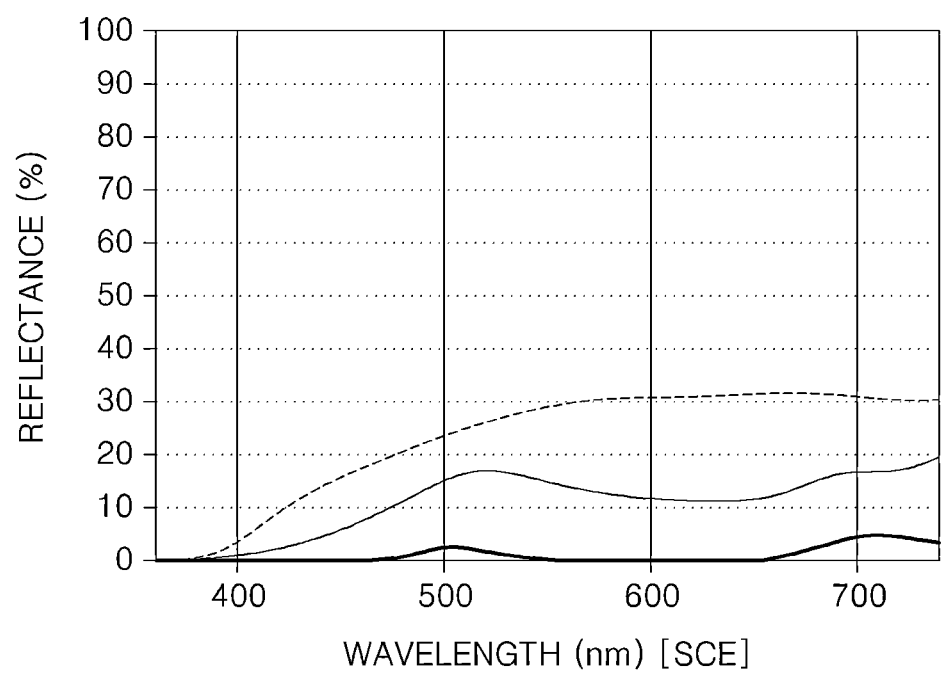
FIG. 4B is a graph of a reflectance with respect to a wavelength when a reducing voltage is applied to an electronic device manufactured according to Example 1.

FIG. 4A is an image showing a color change (0 V→−2.1 V) of an electrochromatic device when a reducing voltage was applied to the electrochromatic device of Example 1, and FIG. 4B is a graph of a reflectance with respect to wavelength when a reducing voltage was applied to the electrochromatic device of Example 1.

Referring to FIG. 4A, it was confirmed that at an applied voltage of 0 V, the electrochromatic device of Example 1 was almost transparent, and at an applied voltage of −2.1 V, the electrochromatic device of Example 1 displayed black. In FIG. 4B, to easily distinguish reflectance graphs directly printed out from the measuring device, only results at an applied voltage of 0 V (dotted line), at an applied voltage of −0.6 V (thin solid line), and at an applied voltage of −2.1 V (thick solid line) were illustrated. In the graph of FIG. 4B, the lower the applied voltage, the lower the reflectance in a wide wavelength range. From these results, it was confirmed that a middle-range gray scale of black was able to be controlled by adjusting the reducing voltage.

A reflectance with respect to wavelength when an oxidizing voltage was applied to the electrochromatic device of Example 1 was measured. An oxidizing voltage was applied in a range of 0 V to 2.0 V at intervals of 0.5 V, and the higher the applied voltage, the more rapidly the reflectance of a shorter wavelength was decreased. However, a reflectance of a longer wavelength that corresponds to red was slowly decreased. Thus, a reflectance corresponding to red was high.

Figure 5A:
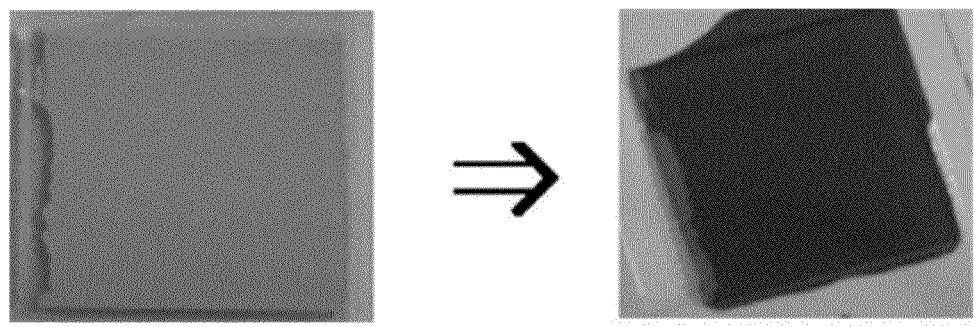
FIG. 5A is an image showing a color change of an electrochromatic device when an oxidizing voltage was applied to the electrochromatic device of Example 1.
Figure 5B:
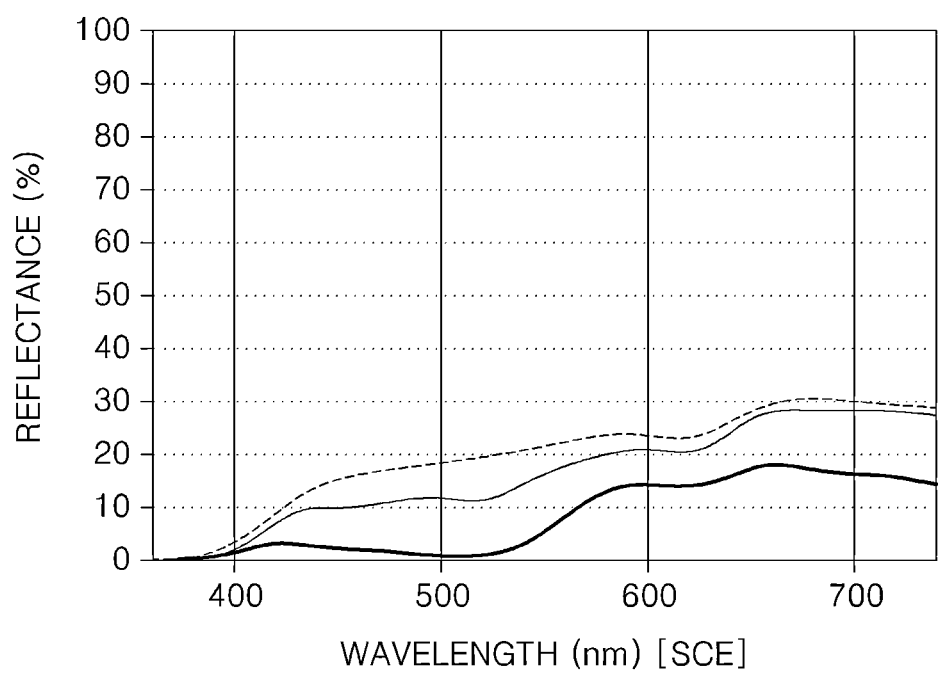
FIG. 5B is a graph of a reflectance with respect to a wavelength when an oxidizing voltage is applied to an electronic device manufactured according to Example 1.

FIG. 5A is an image showing a color change (0 V→2.0 V) of an electrochromatic device when an oxidizing voltage was applied to the electrochromatic device of Example 1. FIG. 5B is a graph of a reflectance with respect to wavelength when an oxidizing voltage was applied to the electrochromatic device of Example 1.

Referring to FIG. 5A, it was confirmed that at an applied voltage of 2.0 V, the electrochromatic device of Example 1 displayed red. In FIG. 5B, to more easily distinguish reflectance graphs directly printed out from the measuring device, only results at an applied voltage of 0 V (dotted line), at an applied voltage of 1.0 V (thin solid line), and at an applied voltage of 2.0 V (thick solid line) were illustrated. In the graph of FIG. 5B, the higher the applied voltage, the relatively slower the reflectance corresponding to red was decreased. From these results, it was confirmed that a middle-range gray scale of red was able to be controlled by adjusting the oxidizing voltage.

Figure 6:
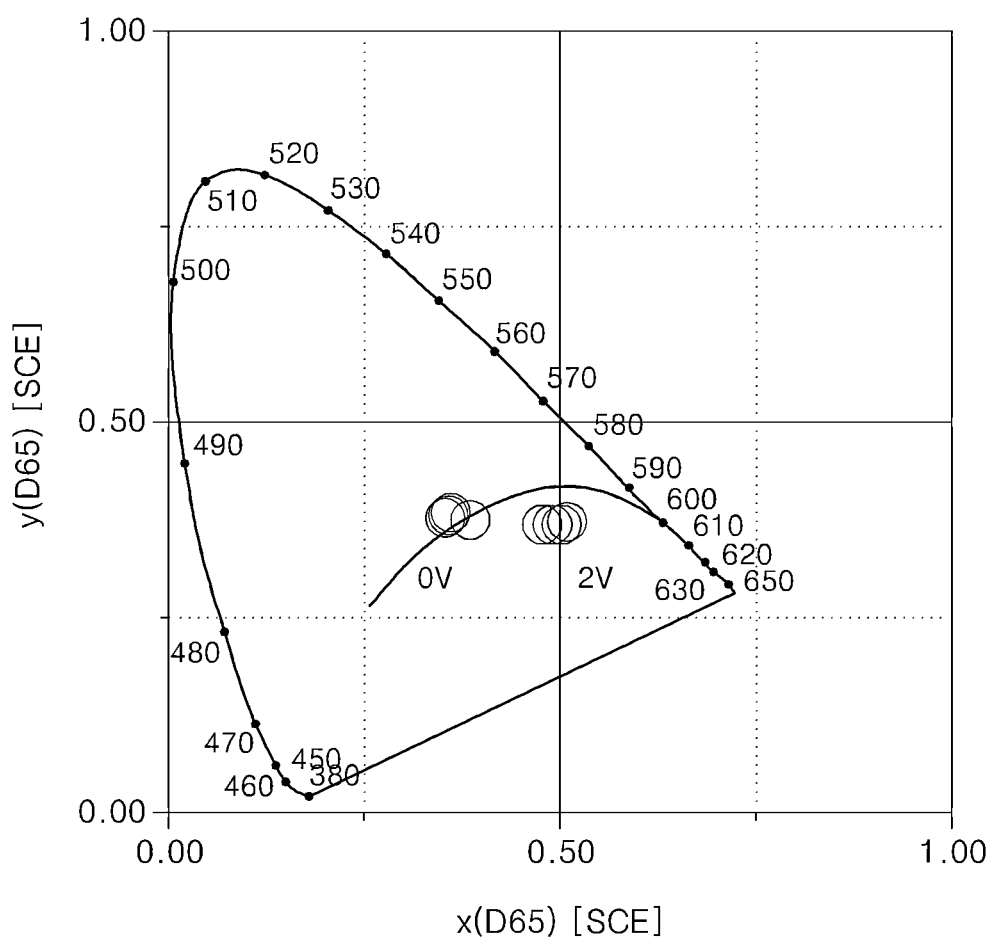
FIG. 6 is a chromaticity diagram illustrating a change of color displayed according to a voltage applied to an electronic device manufactured according to Example 1.

FIG. 6 is a chromaticity diagram illustrating a change of color displayed according to a voltage applied to the electronic device manufactured according to Example 1. A color change displayed by the electrochromatic device when 0 V to 2 V of an oxidizing voltage was applied was measured and results thereof were represented as a national television system committee (NTSC)-type standard chromaticity diagram. In the chromaticity diagram of FIG. 6, x(D65)[SCE] and y(D65)[SCE] respectively denote an x coordinate and a y coordinate of specular component excluded (SCE) data obtained by using a D65 standard illuminant. Referring FIG. 6, it was confirmed that the electrochromatic device of Example 1 displays white, red, and a middle gray scale therebetween in a voltage range of 0 V to 2 V.

Figure 7:
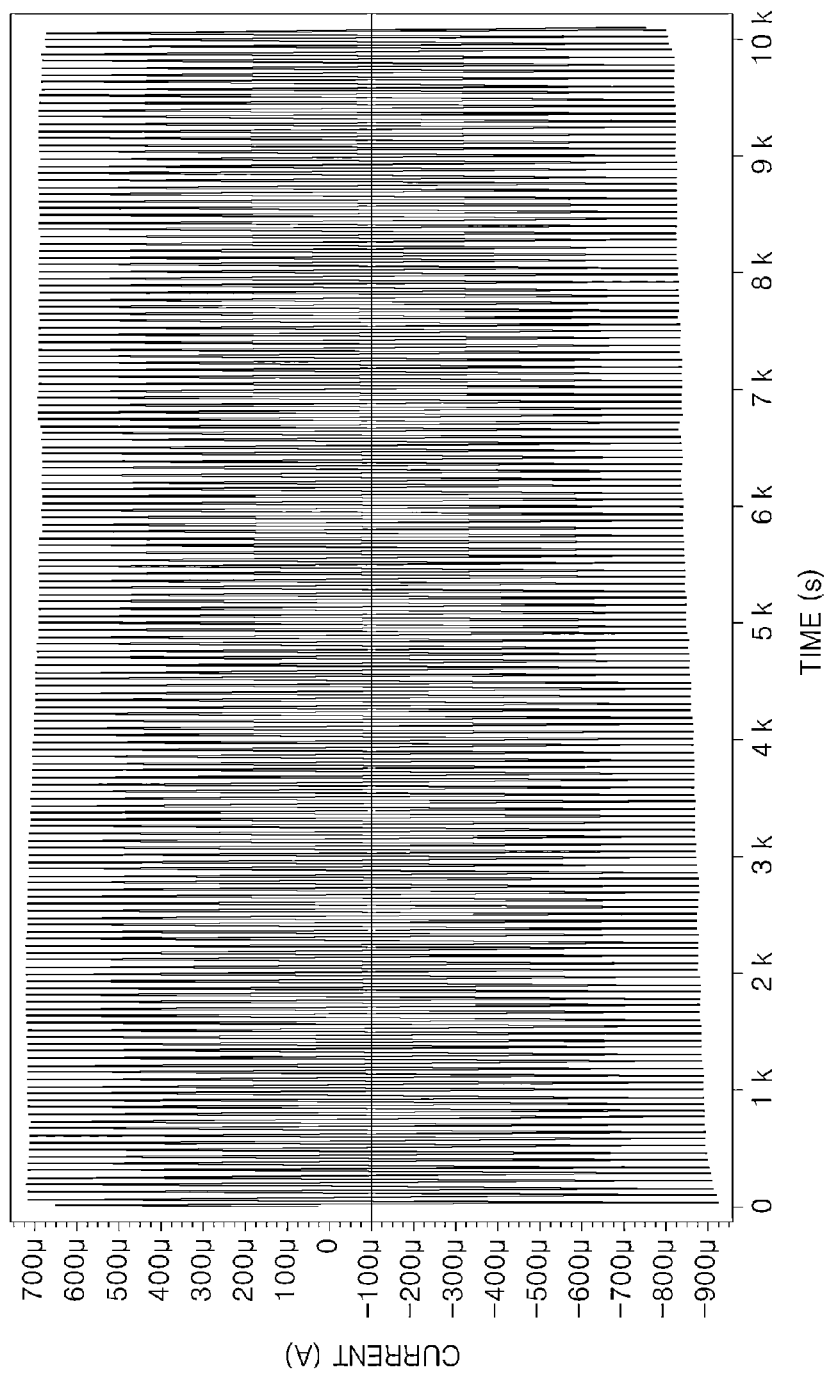
FIG. 7 is a graph of the electrochemical stability of an electronic device manufactured according to Example 1.

FIG. 7 is a graph of the electrochemical stability of the electronic device manufactured according to Example 1. The electrochromatic device of Example 1 was repeatedly driven for 10,000 seconds to measure the current change of the electrochromatic device. During one time driving, a voltage was changed from −1.5 V to +1.5 V for one second. Referring to FIG. 7, the amplitude of a current was changed from a range of about −900 μA to about 700 μA to a range of about −800 μA to about 700 μA. From these results, it was confirmed that the electrochromatic device of Example 1 is electrochemically stable.

A reflectance with respect to wavelength when an oxidizing voltage was applied to the electrochromatic device of Example 2 was measured. An oxidizing voltage was applied in a range of 0 V to 2 V at intervals of 0.4 V, and as the applied voltage increased, the reflectance was decreased. In this regard, a reflectance corresponding to green was relatively high.

Figure 8A:
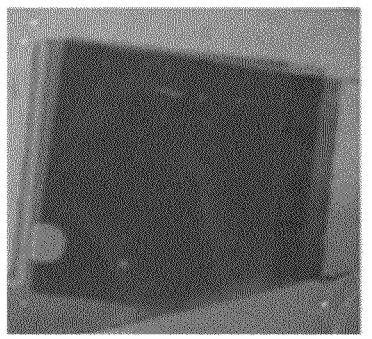
FIG. 8A is an image showing a color change of an electrochromatic device when an oxidizing voltage was applied to the electrochromatic device of Example 2.
Figure 8A:
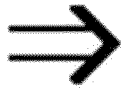
Figure 8A:
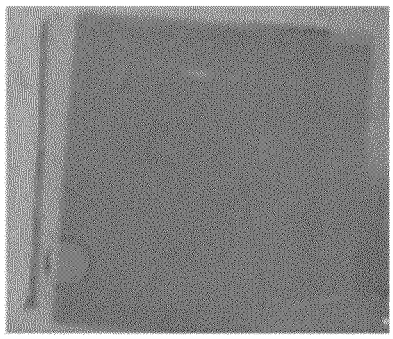
Figure 8B:
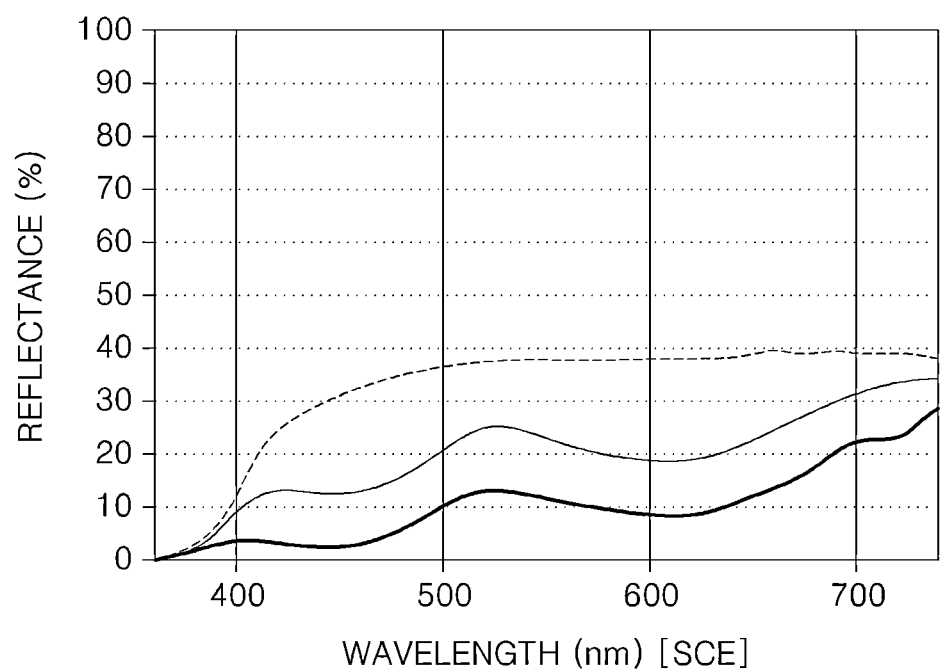
FIG. 8B is a graph of a reflectance with respect to a wavelength when an oxidizing voltage is applied to an electronic device manufactured according to Example 2.

FIG. 8A is an image showing a color change (0 V↔2.0 V) of an electrochromatic device when an oxidizing voltage was applied to the electrochromatic device of Example 2. FIG. 8B is a graph of a reflectance with respect to wavelength when an oxidizing voltage was applied to the electrochromatic device of Example 2.

Referring to FIG. 8A, it was confirmed that at an applied voltage of 2.0 V, the electrochromatic device of Example 2 displayed green. In FIG. 8B, to more easily distinguish reflectance graphs directly printed out from the measuring device, only results at an applied voltage of 0 V (dotted line), at an applied voltage of 0.8 V (thin solid line), and at an applied voltage of 2.0 V (thick solid line) were illustrated. In the graph of FIG. 8B, the higher the applied voltage, the relatively slower the reflectance corresponding to green was decreased. From these results, it was confirmed that a middle-range gray scale of green was able to be controlled by adjusting the oxidizing voltage.

A reflectance with respect to wavelength when a reducing voltage is applied to the electrochromatic device manufactured according to Example 2 was measured. The reducing voltage was applied in a range of 0 V to −2.1 V at intervals of 0.3 V, and the lower applied voltage, that is, the greater the absolute value of the applied voltage is, the more the reflectance was reduced correspondingly.

Figure 9A:
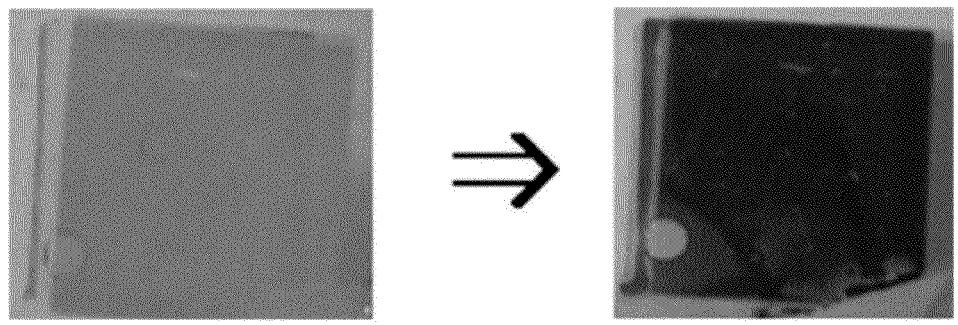
FIG. 9A is an image showing a color change of an electrochromatic device when a reducing voltage was applied to the electrochromatic device of Example 2.
Figure 9B:
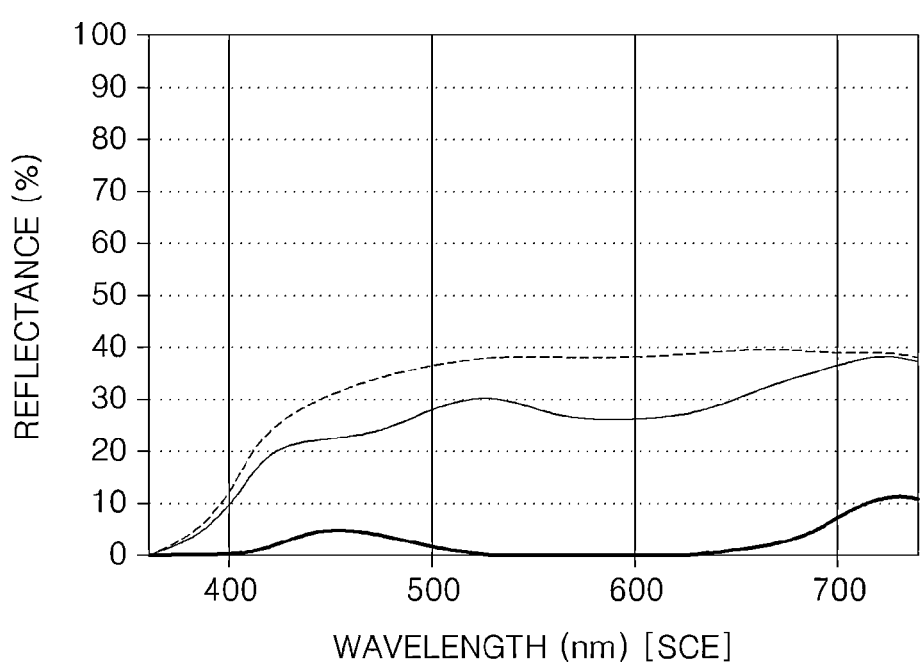
FIG. 9B is a graph of a reflectance with respect to a wavelength when a reducing voltage is applied to an electronic device manufactured according to Example 2.

FIG. 9A is an image showing a color change (0 V→−2.1 V) of an electrochromatic device when a reducing voltage was applied to the electrochromatic device of Example 2. FIG. 9B is a graph of a reflectance with respect to wavelength when a reducing voltage was applied to the electrochromatic device of Example 2.

Referring to FIG. 9A, it was confirmed that at an applied voltage of 0 V, the electrochromatic device of Example 2 was almost transparent, and at an applied voltage of −2.1 V, the electrochromatic device of Example 1 displayed black. In FIG. 9B, to more easily distinguish reflectance graphs directly printed out from the measuring device, only results at an applied voltage of 0 V (dotted line), at an applied voltage of −0.6 V (thin solid line), and at an applied voltage of −2.1 V (thick solid line) were illustrated. In the graph of FIG. 9B, the lower the applied voltage, the lower the reflectance in a wide wavelength range. From these results, it was confirmed that a middle-range gray scale of black was able to be controlled by adjusting the reducing voltage.

Figure 10:
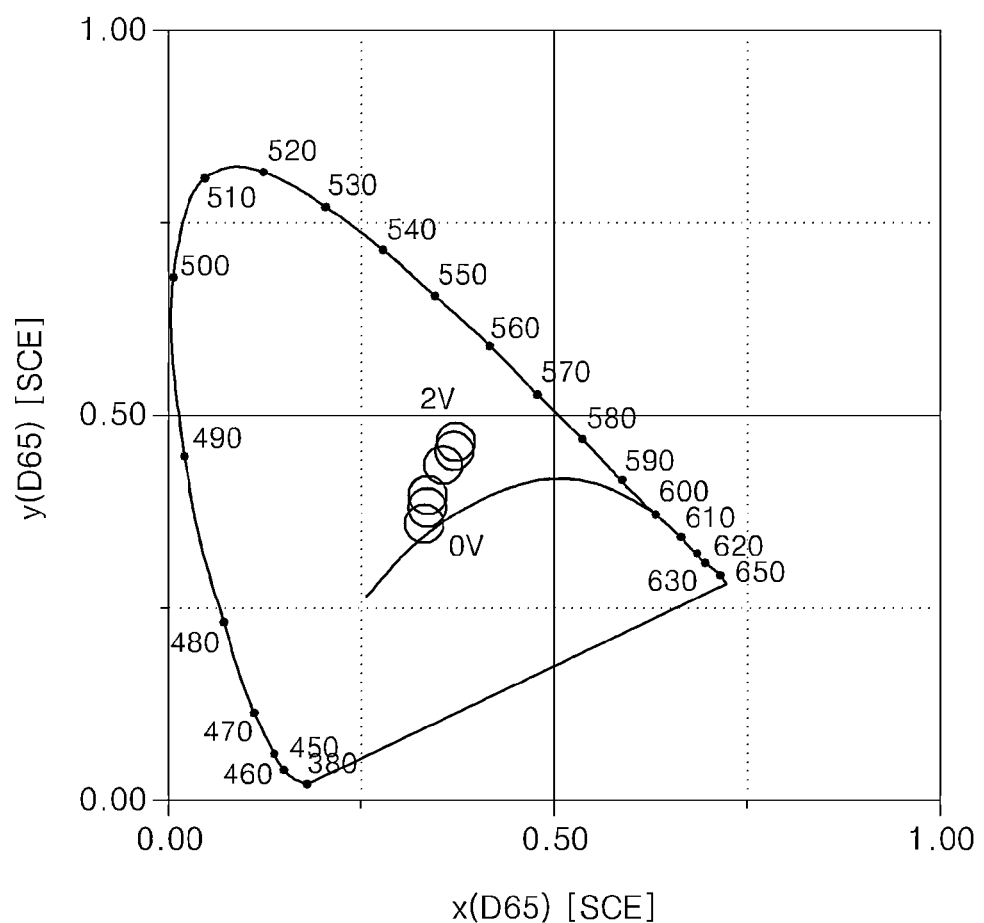
FIG. 10 is a chromaticity diagram illustrating change of color displayed according to a voltage applied to an electronic device manufactured according to Example 2

FIG. 10 is a chromaticity diagram illustrating a change of color displayed according to a voltage applied to the electronic device manufactured according to Example 2. A color change displayed by the electrochromatic device when 0 V to 2 V of an oxidizing voltage was applied was measured. Referring to FIG. 10, it was confirmed that the electrochromatic device of Example 2 displays white, green, and a middle gray scale therebetween in a voltage range of 0 V to 2 V.

A reflectance with respect to wavelength when an oxidizing voltage was applied to the electrochromatic device of Example 3 was measured. An oxidizing voltage was applied in a range of 0 V to 2.0 V at intervals of 0.4 V, and the higher the applied voltage, the more the reflectance was decreased. In this regard, a reflectance corresponding to blue was relatively high.

Figure 11A:
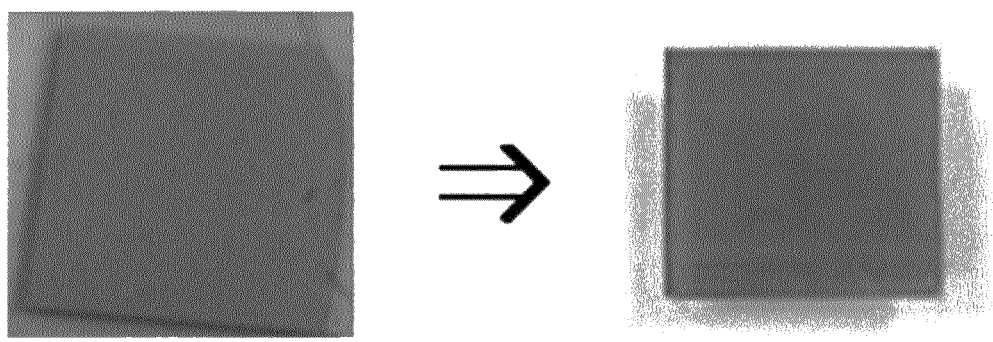
FIG. 11A is an image showing a color change of an electrochromatic device when an oxidizing voltage was applied to the electrochromatic device of Example 3.

FIG. 11A is an image showing a color change (0 V→2.0 V) of an electrochromatic device when an oxidizing voltage was applied to the electrochromatic device of Example 3. FIG.

11B is a graph of a reflectance with respect to wavelength when an oxidizing voltage was applied to the electrochromatic device of Example 3.

Figure 11B:
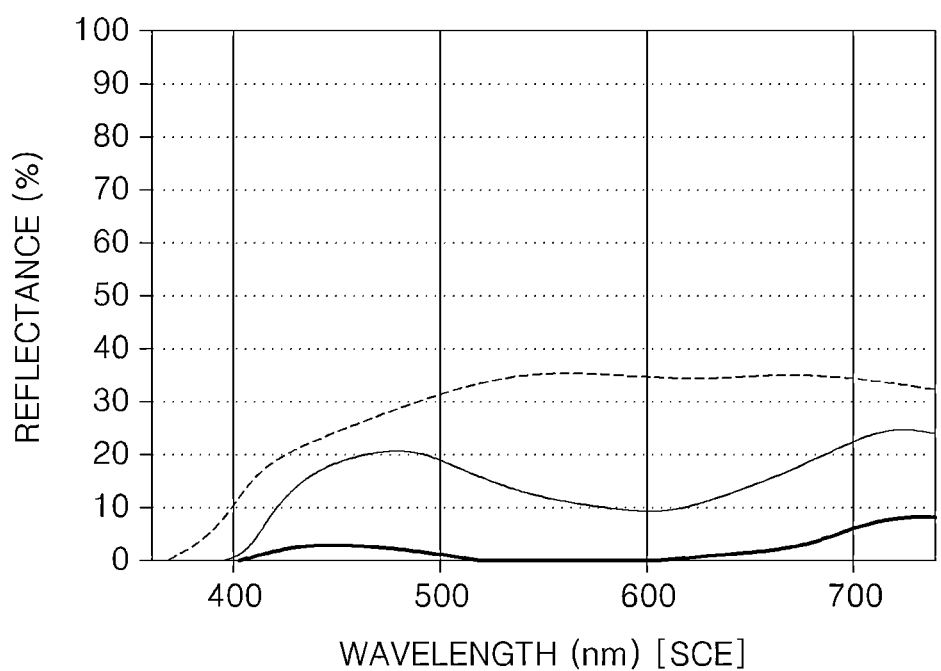
FIG. 11B is a graph of a reflectance with respect to a wavelength when an oxidizing voltage is applied to an electronic device manufactured according to Example 3.

Referring to FIG. 11A, it was confirmed that at an applied voltage of 2.0 V, the electrochromatic device of Example 3 displayed blue. In FIG. 11B, to more easily distinguish reflectance graphs directly printed out from the measuring device, only results at an applied voltage of 0 V (dotted line), at an applied voltage of 0.8 V (thin solid line), and at an applied voltage of 2.0 V (thick solid line) were illustrated. In the graph of FIG. 11B, the higher the applied voltage, the relatively slower the reflectance corresponding to blue was decreased. From these results, it was confirmed that a middle-range gray scale of blue was able to be controlled by adjusting the oxidizing voltage.

Figure 12:
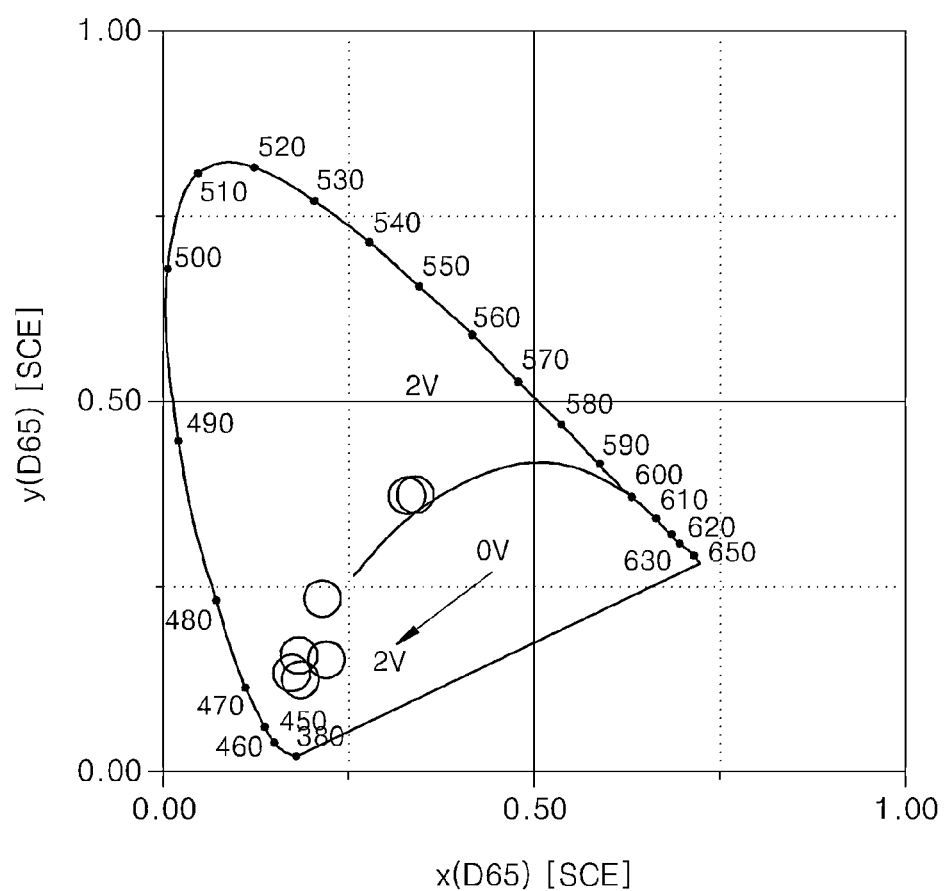
FIG. 12 is a chromaticity diagram illustrating a change of color displayed according to a voltage applied to an electronic device manufactured according to Example 3.

FIG. 12 is a chromaticity diagram illustrating a change of color displayed according to a voltage applied to the electronic device manufactured according to Example 3. The change of color displayed by the electrochromatic device when 0 V to 2 V of an oxidizing voltage was applied was measured. Referring to FIG. 12, it was confirmed that the electrochromatic device of Example 3 displays white, blue, and a middle gray scale therebetween in a voltage range of 0 V to 2 V.

The reflective color displays according to the various embodiments herein have improved color and black visibility by using an electrochromic material that enables display of multi-color and middle-range gray scale color according to a redox state.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A reflective color display comprising:
   a first electrode layer;
   a second electrode layer facing the first electrode layer;
   an electrochromatic layer on the first electrode layer, the electrochromatic layer including an electrochromatic material that is structured to display a color in an oxidation state and to appear black in a reduction state, to appear black in an oxidation state and to display a color in a reduction state, to be transparent in an oxidation state and to appear black in a reduction state, or to appear black in an oxidation state and to be transparent in a reduction state;
   an electrolyte layer contacting the electrochromatic layer, the electrolyte layer located between the first electrode layer and the second electrode layer; and
   a reflective layer on the second electrode layer, the reflective layer being between the electrolyte layer and the second electrode layer.

2. The reflective color display of claim 1, wherein the electrochromatic material is a compound that comprises a first moiety that is structured to display a color when in an oxidation state and a second moiety that is structured to appear black when in a reduction state, the first and second moieties being covalently bonded.

3. The reflective color display of claim 1, wherein the electrochromatic material is a compound that comprises a first moiety that is structured to display a color when in a reduction state and a second moiety that is structured to appear black when in an oxidation state, the first and second moieties being covalently bonded.

4. The reflective color display of claim 1, wherein the electrochromatic material is a mixture comprising a first electrochromatic compound and a second electrochromatic compound, the first electrochromatic compound structured to display a color when in an oxidation state and to be transparent when in a reduction state, the second electrochromatic compound structured to appear black when in a reduction state and to be transparent when in an oxidation state.

5. The reflective color display of claim 1, wherein the electrochromatic material is a mixture comprising a first electrochromatic compound and a second electrochromatic compound, the first electrochromatic compound structured to display a color when in a reduction state and to be transparent when in an oxidation state, the second electrochromatic compound structured to appear black when in an oxidation state and to be transparent when in an reduction state.

6. The reflective color display of claim 1, further comprising:
   a counter redox material layer between the second electrode layer and the reflective layer, the counter redox material layer structured to oxidize or reduce in an opposite direction to that of the electrochromatic material, the counter redox material layer including a transparent material.

7. The reflective color display of claim 1, wherein the electrolyte layer is transparent and includes a material that is structured to oxidize or reduce in an opposite direction to that of the electrochromatic material.

8. A reflective color display comprising:
   a first substrate;
   a second substrate facing the first substrate;
   a first electrode layer on the first substrate;
   a second electrode layer on the second substrate;
   an electrochromatic layer on the first electrode layer, the electrochromatic layer including an electrochromatic material that is structured to display a color in an oxidation state and to appear black in a reduction state;
   a reflective layer on the second electrode layer; and
   an electrolyte layer between the first electrode layer and the second electrode layer, the electrolyte layer contacting the electrochromatic layer and the reflective layer, the reflective layer being between the electrolyte layer and the second electrode layer.

9. The reflective color display of claim 8, wherein the electrochromatic material comprises a compound represented by Formula 1A below, the compound represented by Formula 1A structured to display red when in an oxidation state and to appear black when in a reduction state:

[Formula 1A]
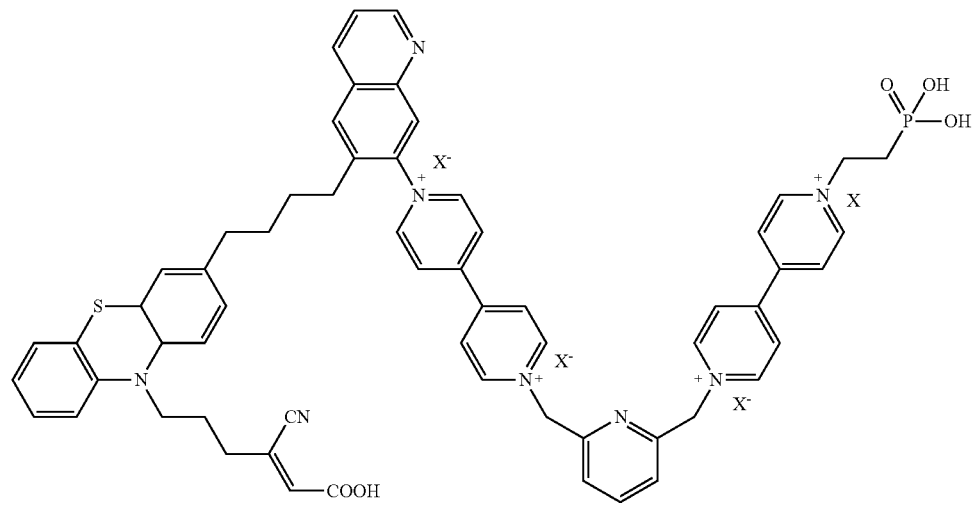
wherein X⁻ is F⁻, Cl⁻, or Br⁻.
10. The reflective color display of claim 8, wherein the electrochromatic material comprises at least one of compounds represented by Formula 3A or Formula 3B below, the compounds represented by Formula 3A or Formula 3B structured to display green when in an oxidation state and to appear black when in a reduction state:
[Formula 3A]
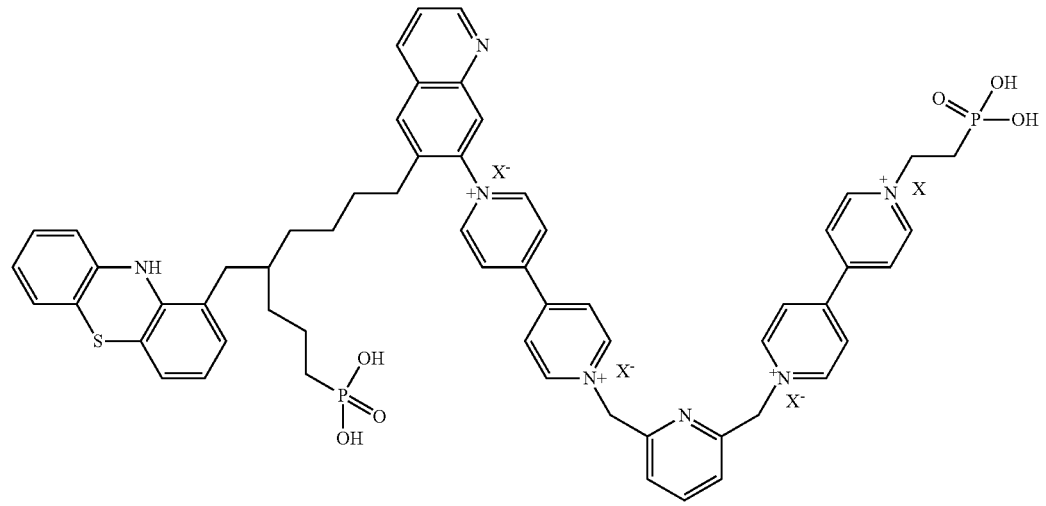

[Formula 3B]

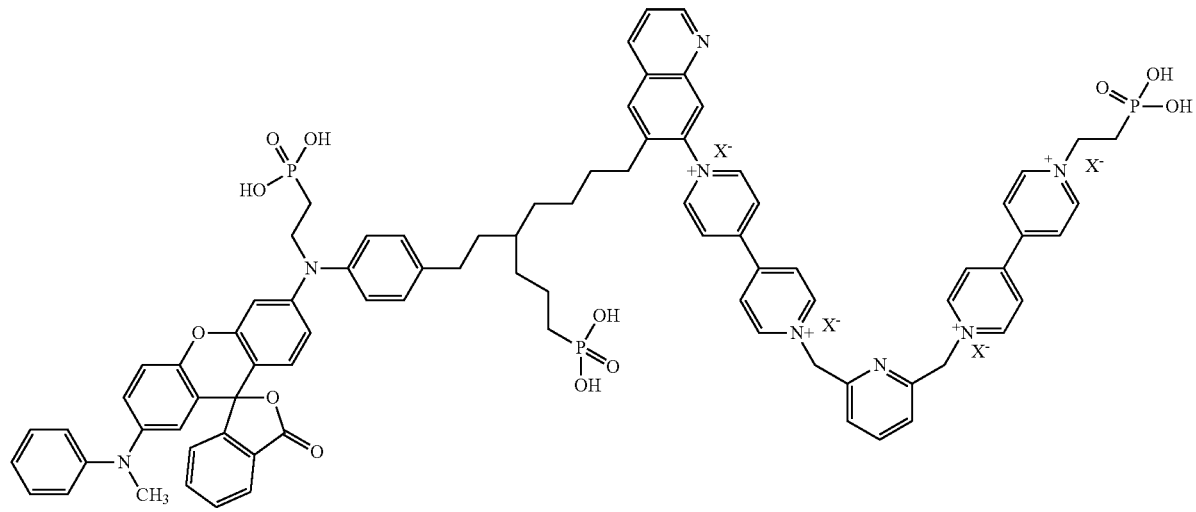

wherein X⁻ is F⁻, Cl⁻, or Br⁻.

11. The reflective color display of claim 8, wherein the electrochromatic material comprises a compound represented by Formula 5A below, the compound represented by Formula 5A structured to display blue when in an oxidation state and to appear black when in a reduction state:

[Formula 5A]

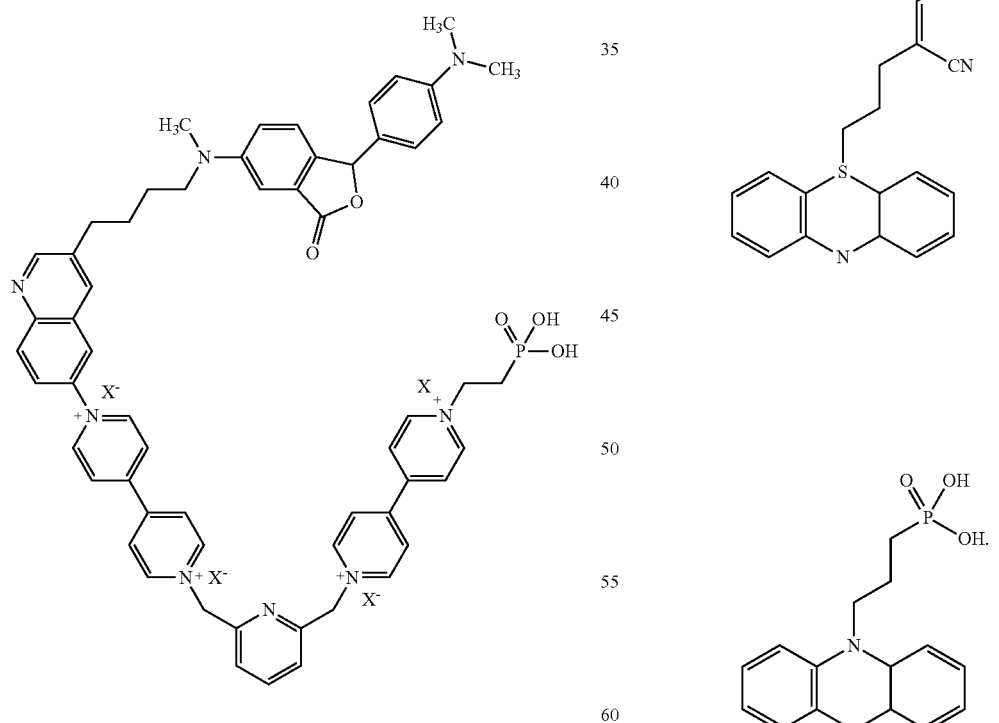

wherein X⁻ is F⁻, Cl⁻, or Br⁻.

12. The reflective color display of claim 8, wherein the electrochromatic material is a mixture comprising a first electrochromatic material and a second electrochromatic material, the first electrochromatic material structured to display a color when in an oxidation state, the second electrochromatic material structured to appear black when in a reduction state.

13. The reflective color display of claim 12, wherein the first electrochromatic material comprises a compound represented by Formula 2A1 or Formula 2A2 below, the compound represented by Formula 2A1 or Formula 2A2 structured to display red when in an oxidation state:

[Formula 2A1]

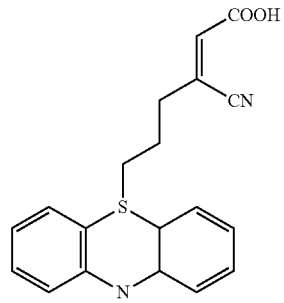

[Formula 2A2]

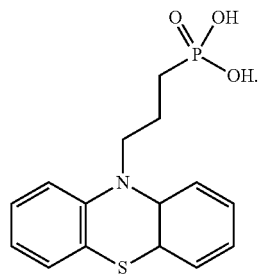

14. The reflective color display of claim 12, wherein the first electrochromatic material comprises a compound represented by Formula 4A1 or Formula 4A2 below, the compound represented by Formula 4A1 or Formula 4A2 structured to display green when in an oxidation state:

[Formula 4A1]

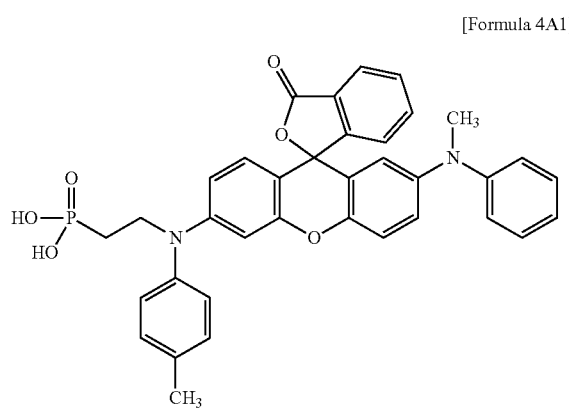

[Formula 2B1]

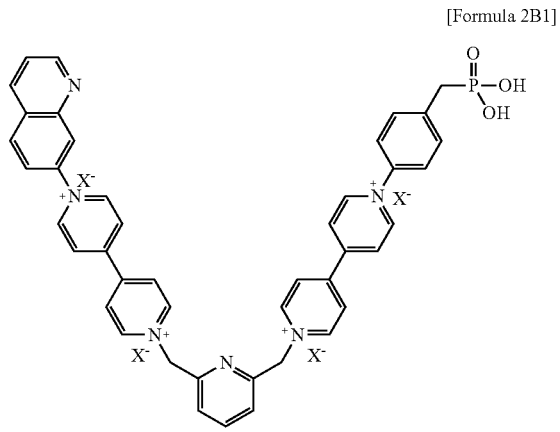

[Formula 4A2]

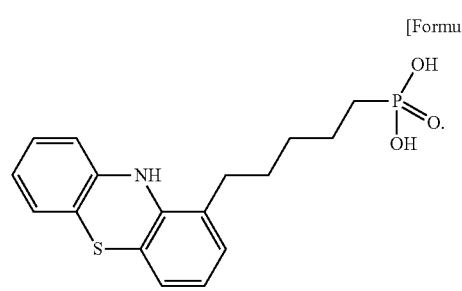

[Formula 2B2]

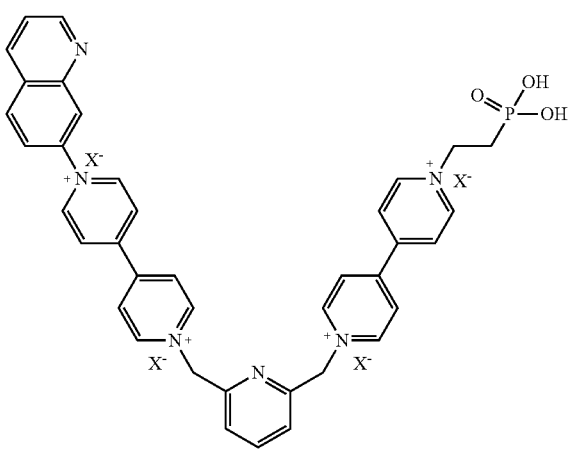

15. The reflective color display of claim 12, wherein the first electrochromatic material comprises a compound represented by Formula 6A1 below, the compound represented by Formula 6A1 structured to display blue when in an oxidation state:

[Formula 6A1]

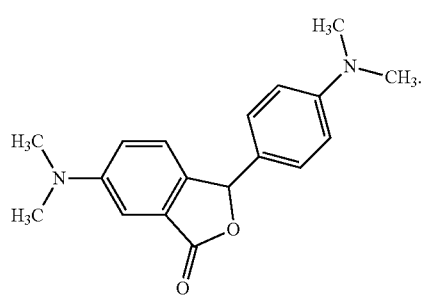

16. The reflective color display of claim 12, wherein the second electrochromatic material comprises a compound represented by Formula 2B1 or Formula 2B2:

wherein $X^-$ is $F^-$, $Cl^-$, or $Br^-$.

17. The reflective color display of claim 8, further comprising:
   a counter redox layer between the second electrode layer and the reflective layer, the counter redox layer structured to oxidize or reduce in an opposite direction to that of the electrochromatic material, the counter redox layer including a transparent material.

18. The reflective color display of claim 8, wherein the electrolyte layer is transparent and includes a material that is structured to oxidize or reduce in an opposite direction to that of the electrochromatic material layer.

19. The reflective color display of claim 18, wherein the material that is structured to oxidize or reduce includes at least one selected from 1,2-diphenylethane, triphenylstibine, and benzoquinone, and at least one selected from hydroquinone, antimony doped tin oxide (ATO), and a ferrocene-based compound.

20. A reflective color display comprising:
   a first substrate;
   a second substrate facing the first substrate;

a first electrode layer on the first substrate;
a second electrode layer on the second substrate;
an electrochromatic layer on the first electrode layer, the electrochromatic layer including an electrochromatic material that is structured to display a color in a reduction state and to appear black in an oxidation state;
a reflective layer on the second electrode layer; and
an electrolyte layer between the first electrode layer and the second electrode layer, the electrolyte layer contacting the electrochromatic layer and the reflective layer, the reflective layer being between the electrolyte layer and the second electrode layer.

21. The reflective color display of claim 20, wherein the electrochromatic material comprises a compound represented by Formula 7A below, the compound represented by Formula 7A structured to display red when in a reduction state and to appear black when in an oxidation state:

[Formula 7A]

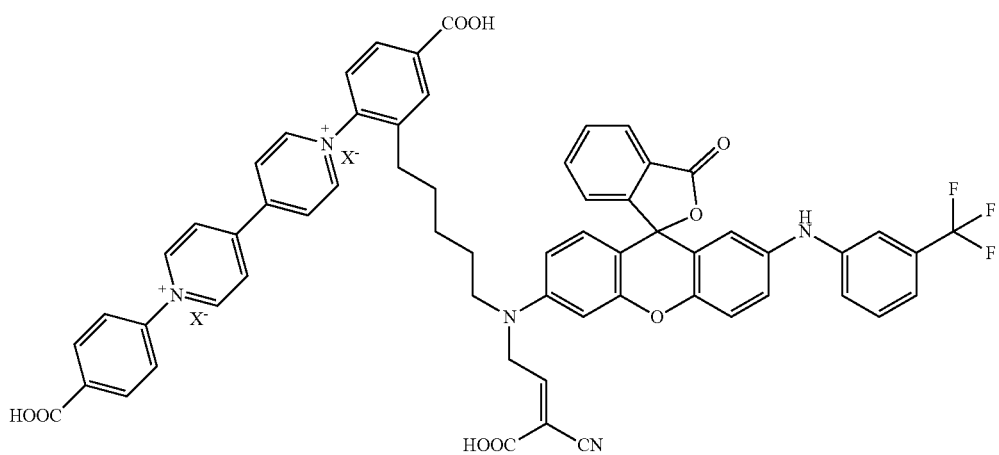

wherein $X^-$ is $F^-$, $Cl^-$, or $Br^-$.

22. The reflective color display of claim 20, wherein the electrochromatic material comprises a compound represented by Formula 9A below, the compound represented by Formula 9A structured to display green when in a reduction state and to appear black when in an oxidation state:

[Formula 9A]

wherein $X^-$ is $F^-$, $Cl^-$, or $Br^-$.

23. The reflective color display of claim 20, wherein the electrochromatic material comprises a compound represented by Formula 11A below, the compound represented by Formula 11A structured to display blue when in a reduction state and to appear black when in an oxidation state:

[Formula 11A]

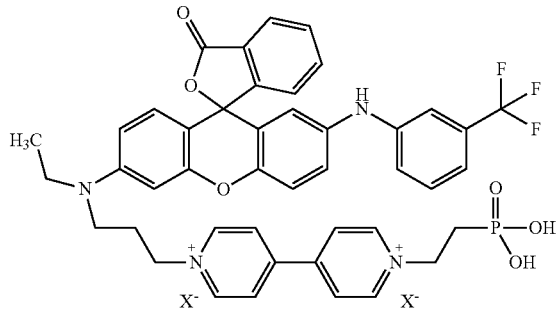

wherein $X^-$ is $F^-$, $Cl^-$, or $Br^-$.

24. The reflective color display of claim 20, wherein the electrochromatic material is a mixture comprising a first electrochromatic material and a second electrochromatic material, the first electrochromatic material structured to display a color when in a reduction state, the second electrochromatic material structured to appear black when in an oxidation state.

25. The reflective color display of claim 24, wherein the first electrochromatic material comprises a compound represented by Formula 8A1 below, the compound represented by Formula 8A1 structured to display red when in a reduction state:

[Formula 8A1]

wherein $X^-$ is $F^-$, $Cl^-$, or $Br^-$.

26. The reflective color display of claim 24, wherein the first electrochromatic material comprises at least one of compounds represented by Formula 10A1 or Formula 10A2 below, the compounds represented by Formula 10A1 or Formula 10A2 structured to display green when in a reduction state:

[Formula 10A1]

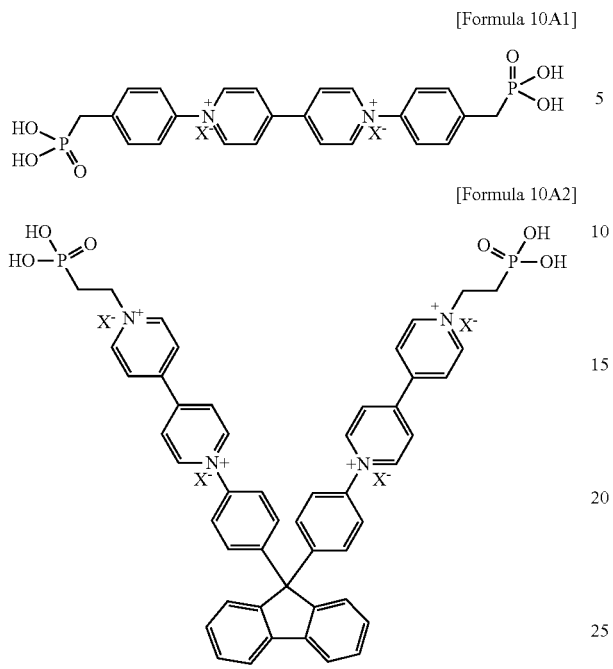

[Formula 10A2]

wherein X⁻ is F⁻, Cl⁻, or Br⁻.

27. The reflective color display of claim 24, wherein the first electrochromatic material comprises a compound represented by Formula 12A1 below, the compound represented by Formula 12A1 structured to display blue when in a reduction state:

[Formula 12A1]

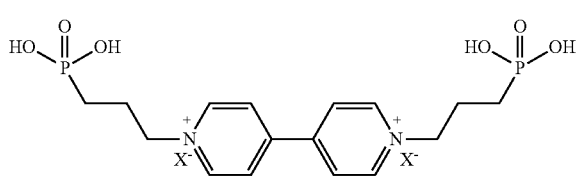

wherein X⁻ is F⁻, Cl⁻, or Br⁻.

28. The reflective color display of claim 24, wherein the second electrochromatic material comprises a compound represented by Formula 8B1 or Formula 8B2 below:

[Formula 8B1]

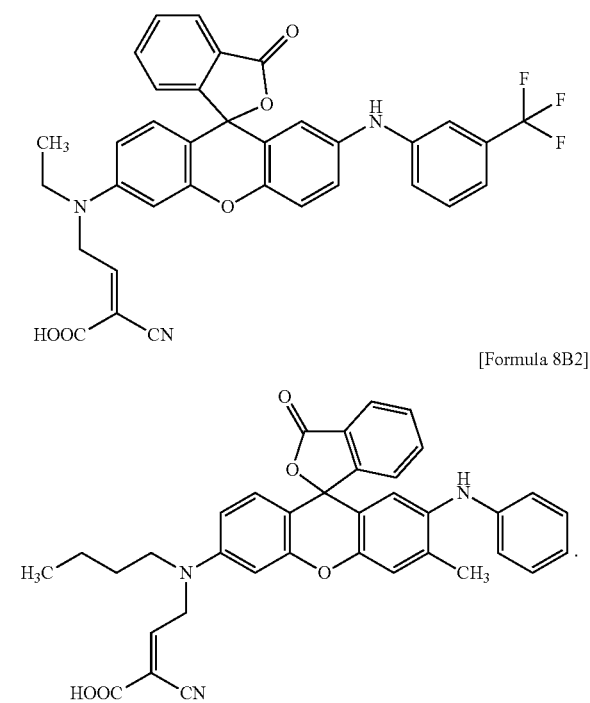

[Formula 8B2]

29. The reflective color display of claim 20, further comprising:
a counter redox layer between the second electrode layer and the reflective layer, the counter redox layer structured to oxidize or reduce in an opposite direction to that of the electrochromatic material, the counter redox layer including a transparent material.

30. The reflective color display of claim 20, wherein the electrolyte layer is transparent and includes a material that is structured to oxidize or reduce in an opposite direction to that of the electrochromatic material layer.

31. The reflective color display device of claim 30, wherein the material that is structured to oxidize or reduce includes at least one selected from 1,2-diphenylethane, triphenylstibine, and benzoquinone, and at least one selected from hydroquinone, antimony doped tin oxide (ATO), and a ferrocene-based compound.

* * * * *